United States Patent [19]

Tokuyama et al.

[11] Patent Number: 5,390,059
[45] Date of Patent: Feb. 14, 1995

[54] FLYING HEAD SLIDER SUPPORTING MECHANISM HAVING ACTIVE AIR PRESSURE CONTROL

[75] Inventors: Mikio Tokuyama; Yuzo Yamaguchi; Katsuaki Kikuchi, all of Tsuchiura; Kousaku Wakatasuki, Ibaraki; Shoi Suzuki, Hamamatsu; Yoshinori Takeuchi, Ishioka, all of Japan

[73] Assignee: Hitachi, Ltd., Tokyo, Japan

[21] Appl. No.: 95,420

[22] Filed: Jul. 22, 1993

Related U.S. Application Data

[63] Continuation of Ser. No. 531,308, May 31, 1990, abandoned.

[30] Foreign Application Priority Data

| Jun. 1, 1989 | [JP] | Japan | 1-140006 |
| Jul. 6, 1989 | [JP] | Japan | 1-174934 |

[51] Int. Cl.⁶ .................................... G11B 21/21
[52] U.S. Cl. ........................... 360/104; 360/103
[58] Field of Search ........................ 360/103–106, 360/97.01, 97.02, 97.03, 137

[56] References Cited

U.S. PATENT DOCUMENTS

| 2,905,768 | 9/1959 | Cronquist | 360/103 |
| 3,132,328 | 5/1964 | Taylor | 360/103 |
| 3,148,248 | 9/1964 | Johnson | 360/103 |
| 3,268,877 | 8/1966 | Hagen | 360/103 |
| 3,327,916 | 6/1967 | Weidenhammer et al. | 360/103 |
| 3,414,880 | 12/1968 | Humphrey | 360/103 |
| 3,676,874 | 7/1972 | Turner | 360/103 |
| 3,893,185 | 7/1975 | Ring et al. | 360/103 |
| 3,992,576 | 11/1976 | Sugiura | 360/103 |
| 4,141,049 | 2/1979 | Watrous | 360/105 |
| 4,167,765 | 9/1979 | Watrous | 360/103 |
| 4,670,804 | 6/1987 | Kant et al. | 360/103 |
| 4,837,648 | 6/1989 | Yamauchi | 360/103 |
| 4,975,795 | 12/1990 | Spash | 360/104 |
| 5,136,438 | 8/1992 | Wakatsuki et al. | 360/105 |

FOREIGN PATENT DOCUMENTS

| 56-134355 | 10/1981 | Japan . |
| 57-569 | 1/1982 | Japan . |
| 58-85977 | 5/1983 | Japan . |
| 58-105470 | 6/1983 | Japan . |
| 59-18780 | 4/1984 | Japan . |
| 61-94280A | 10/1984 | Japan . |
| 61-267979A | 5/1985 | Japan . |
| 62-99967 | 5/1987 | Japan . |
| 63-56625 | 11/1988 | Japan . |

*Primary Examiner*—Stuart S. Levy
*Assistant Examiner*—Jefferson Evans
*Attorney, Agent, or Firm*—Antonelli, Terry, Stout & Kraus

[57] ABSTRACT

A flying head slider supporting mechanism comprises a rigid body disposed away from the surface of a magnetic recording medium by a predetermined distance, an air flow passage extending through the rigid body to the surface of the magnetic recording medium, a device for generating an air flow passing through the air flow passage toward the surface of the magnetic recording medium or generating an air flow passing from the surface, a read/write head for reproducing data recording on the magnetic recording medium or recording the same on the magnetic recording medium, a head slider disposed in the air flow and supporting the read/write head, a device for supporting the head slider movable relative to the rigid body in a direction perpendicular to the surface of the magnetic recording medium, and a device for generating a relative movement between the head slider and the magnetic recording medium.

2 Claims, 35 Drawing Sheets

F I G. 20A    F I G. 20B
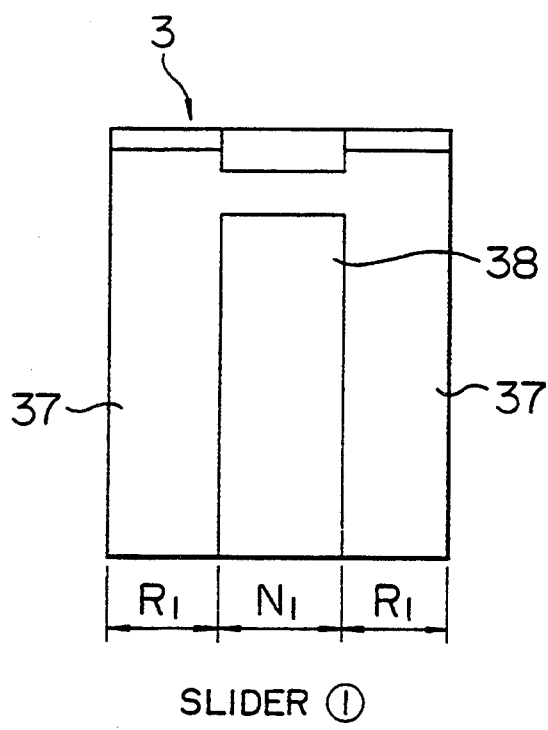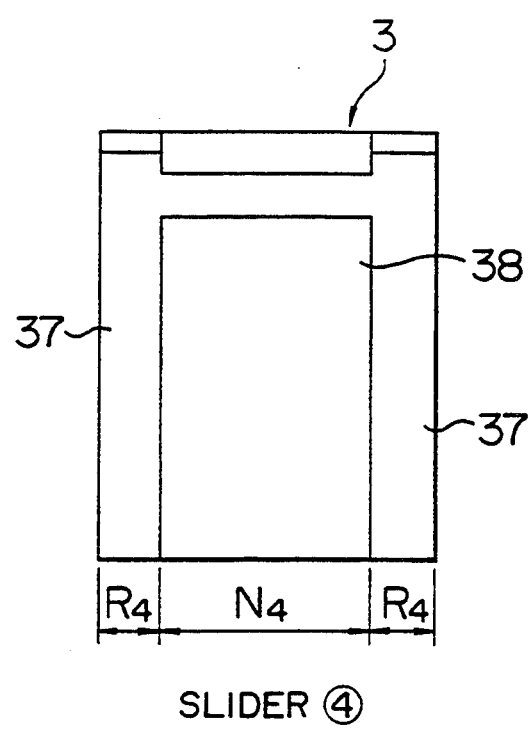
SLIDER ①    SLIDER ④
F I G. 21
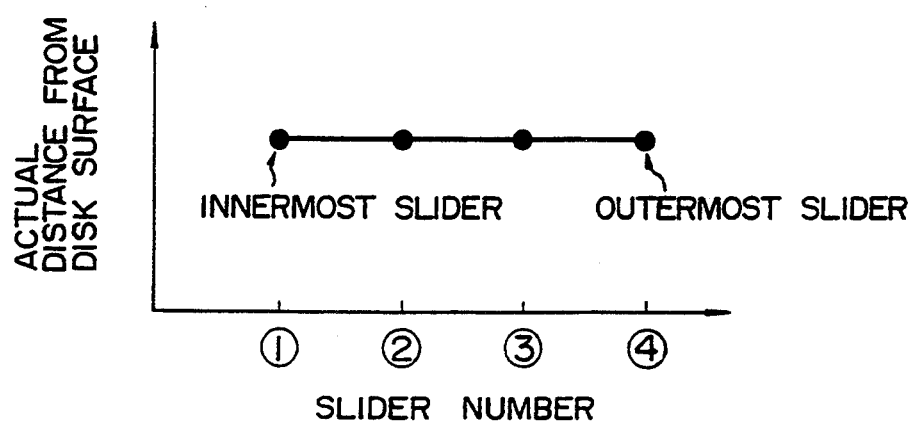

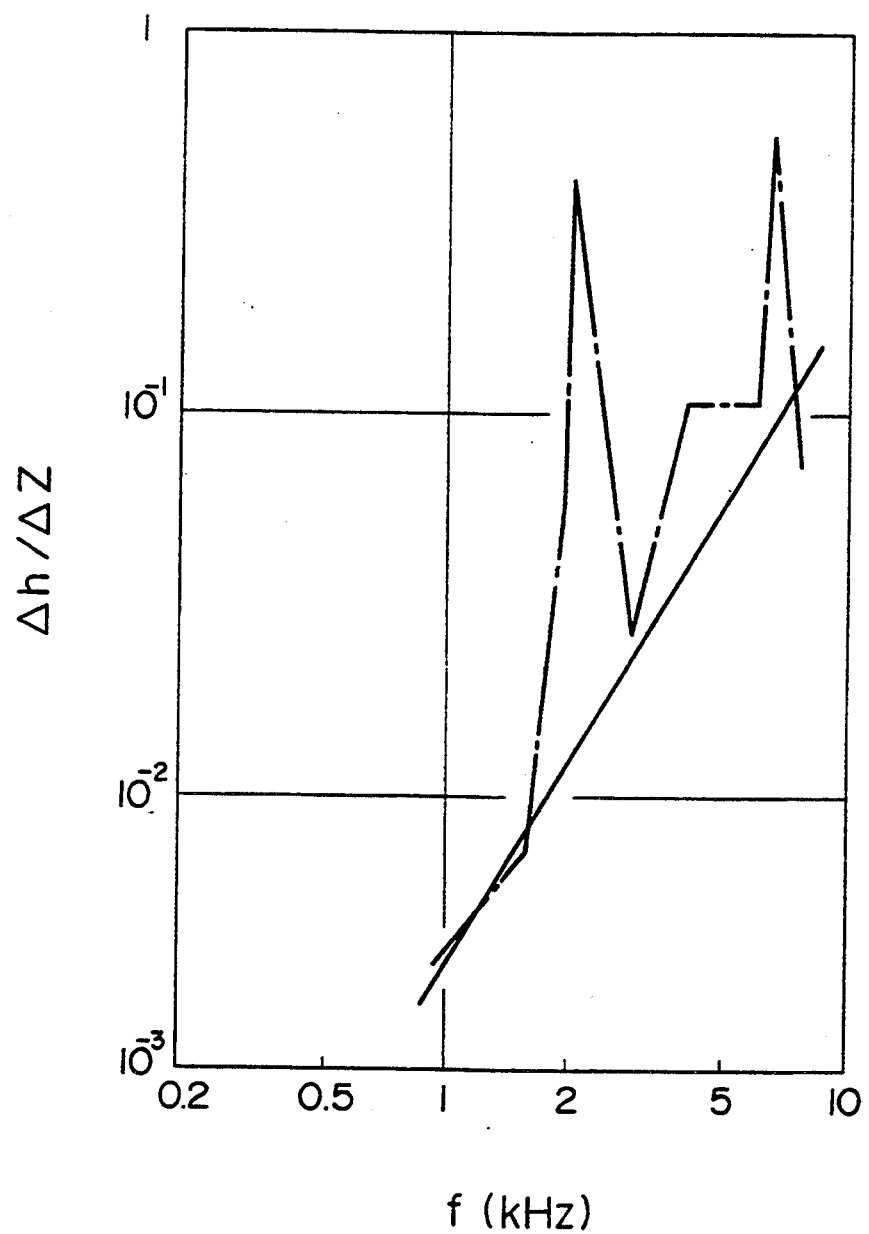
F I G. 37

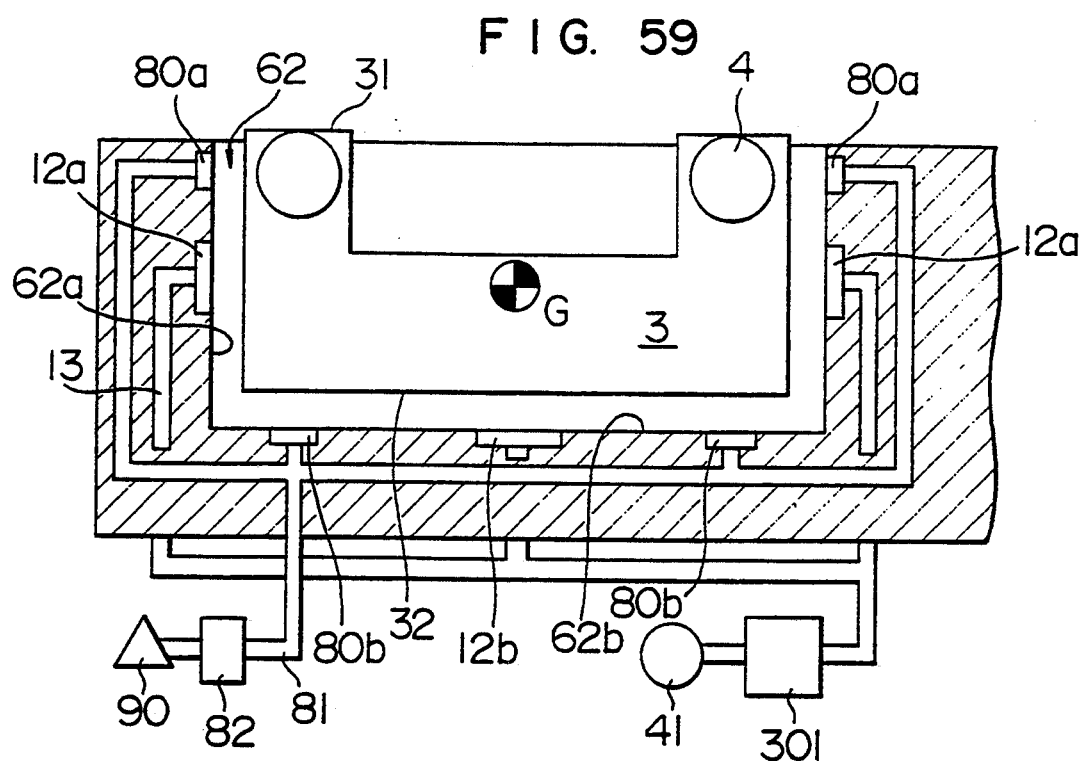
F I G. 59
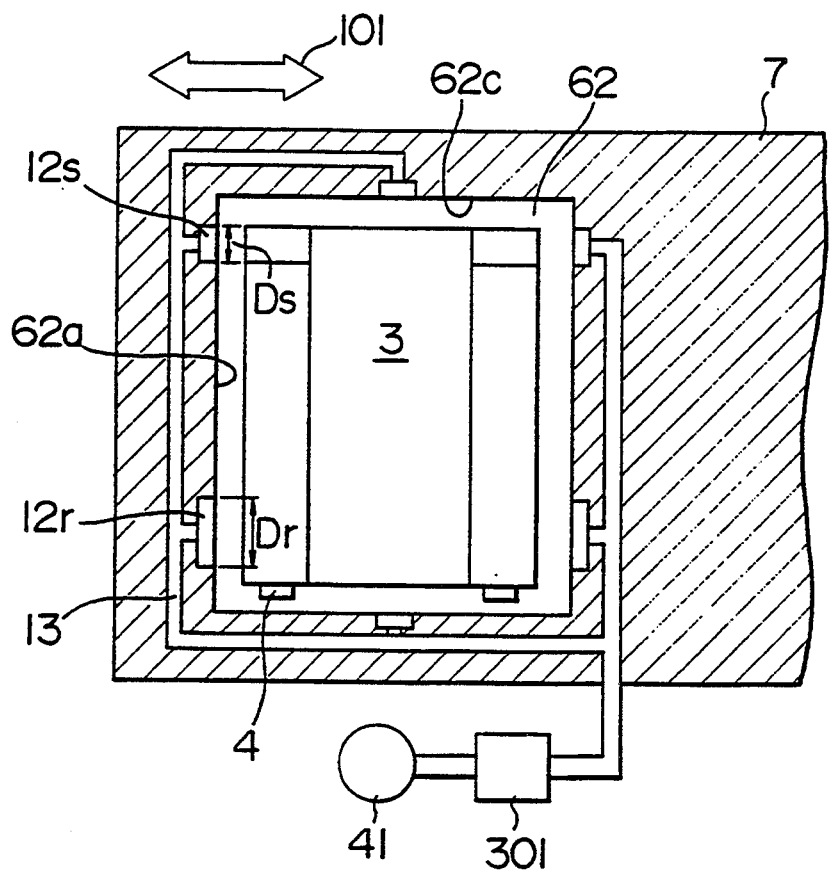
F I G. 60

F I G. 63
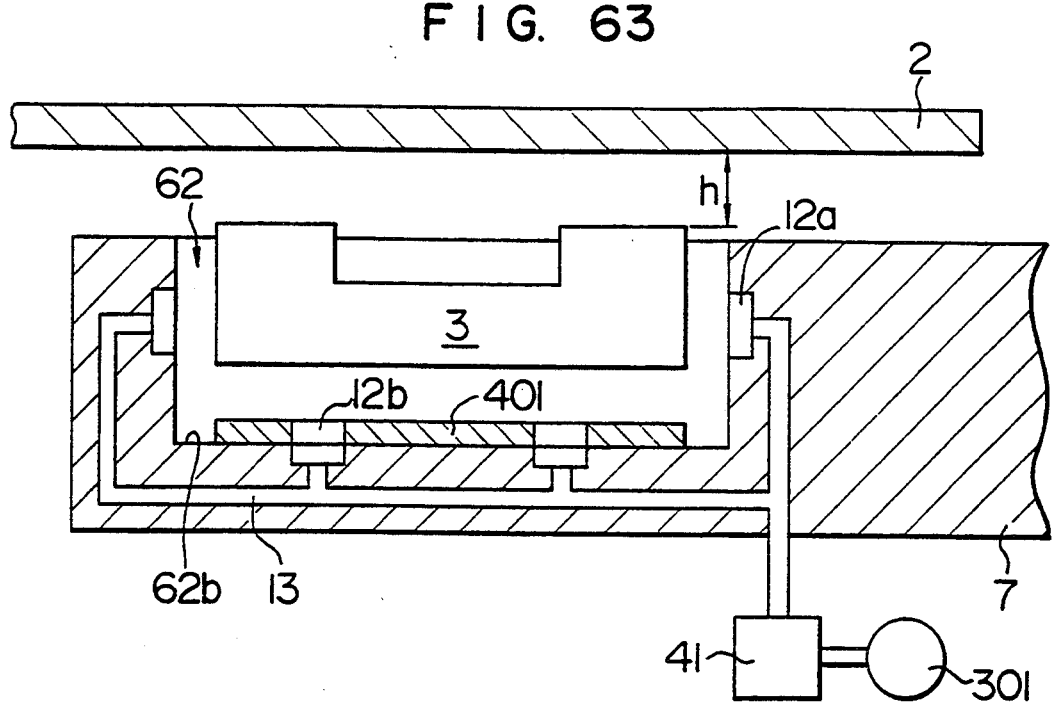
F I G. 64
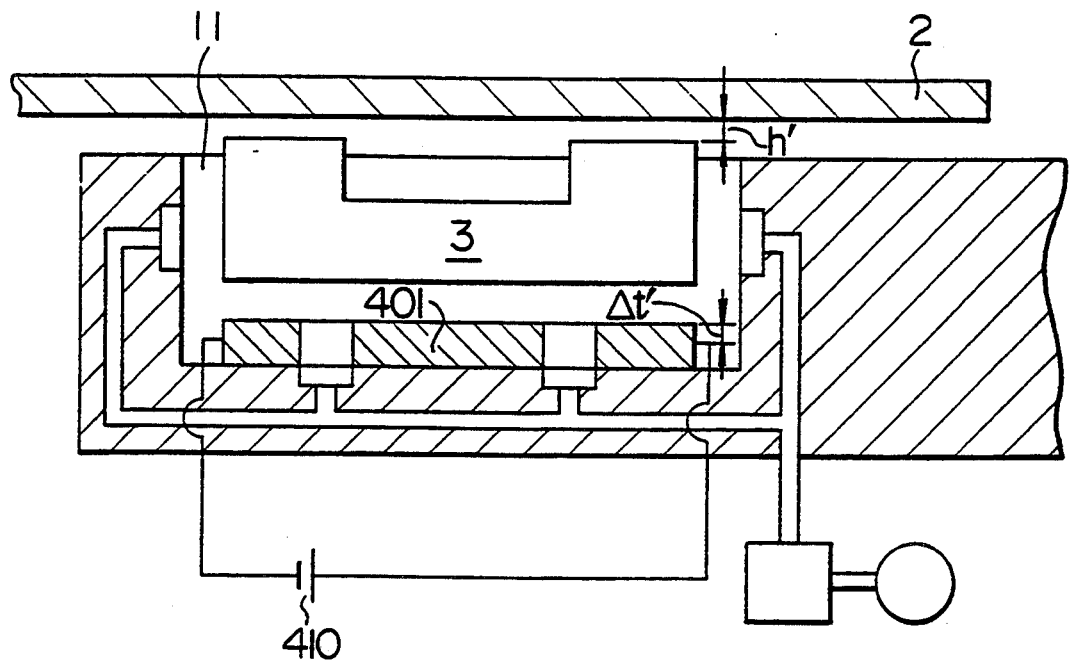

FLYING HEAD SLIDER SUPPORTING MECHANISM HAVING ACTIVE AIR PRESSURE CONTROL

This is a continuation of application Ser. No. 531,308, filed May 31, 1990, now abandoned.

FIELD OF THE INVENTION AND RELATED ART STATEMENT

The present invention relates to a flying head slider supporting mechanism, and, more particularly, to a flying head slider supporting mechanism for supporting a head slider for reading/writing data to and from a magnetic recording medium in, for example, a magnetic disc drive apparatus.

In general, the flying head slider for the magnetic disc drive apparatus flies from the surface of the magnetic disc in such a manner that a thin air layer is formed between the head slider and the magnetic disc by utilizing the dynamic bearing effect realized by an air flow created by the rotation of the magnetic disc. In order to ensure the satisfactory flying characteristics of the head slider when following the magnetic disc and to improve the reliability of the slider flying mechanism, it is necessary for the flying head slider supporting mechanism to have a sufficiently reduced supporting rigidity so as not to hinder the operation of the flying head slider and also be capable of applying a desired load to the flying head slider. On the other hand, it is desirable that the magnetic disc drive apparatus possess a high speed accessing function, that is, a high speed data read/write function. If the slider comes in contact with the magnetic disc during the stoppage of the operation of the apparatus, moisture can be generated in a narrow space between the slider and the magnetic disc due to a capillary aggregation and, as a result, adhesion can occur. By virtue of adhesion the slider and the magnetic disc are undesirably caused to be rotated together or the rotation of the magnetic disc becomes impossible. In order to prevent adhesion, it is desirable to have a flying head slider supporting mechanism capable of supporting the slider in such a manner the slider does not contact the magnetic disc even if the magnetic disc drive apparatus is not operated, and a flying head supporting mechanism capable of eliminating the possibility of adhesion.

In, for example, JP-B-58-22827, a conventional flying head slider supporting mechanism comprises a loading arm having a supported end portion and a slider fastened to another end portion of the loading arm via a gimbal spring, whereby a load is applied to the slider from the loading arm to which an elastic force is applied. However, a problem arises in the conventional flying head slider supporting mechanism in that the characteristics of the slider to follow the surface of the magnetic disc deteriorates due to an influence of inertia or the characteristic frequency of the loading arm.

In order to overcome the above-described problem and to meet the above-described requirement, a flying head slider supporting mechanism has been proposed in JP-A-62-99967. According to this disclosure, the slider is mounted to a viscoelastic film fixed to the supporting member. A necessary load or a displacement for loading or unloading is given to the slider by adjusting the level of the pressure of air in the space defined by the supporting member and a backside of the viscoelastic film.

However, the head slider supporting mechanism with the viscoelastic film has a number of disadvantages. More particularly, since the point of action of accelerating force acting on the slider at the data accessing does not coincide with the center of gravity of the slider, moment (rotational force) acts on the slider due to the accelerating force, causing the slider to be swung and/or vibrated. Therefore, a problem arises in an operation of reading data written at a predetermined radial position of the magnetic disc. As a result, the reliability of the magnetic disc drive apparatus can be critically deteriorated. That is, if large accelerating force is applied to the slider for realizing a high speed data access, the slider can be easily vibrated since the center of gravity does not coincide with the point of action.

Furthermore, a problem arises in that the tension of the viscoelastic film can be changed and deteriorated with time and dust can be easily generated from the viscoelastic film due to the change or the deterioration of the viscoelastic film. That is, the viscoelastic film can deteriorate with time and dust can be generated from the viscoelastic film since the viscoelastic film is expanded and contracted due to the pressure difference between the surface to which the slider is mounted and the opposite surface. If dust adheres to the slider, a small gap between the slider and the magnetic disc is reduced, causing a possibility of damage of data written on the magnetic disk.

Additionally, since the opposite surface is pressurized to apply a load to the slider, the viscoelastic film must be airtightly fixed to the supporting member. In general, the magnetic disc drive apparatus must operate for 5 to 10 years without maintenance. However, it is very difficult to manufacture a structure in which the viscoelastic film can be airtightly fastened to the supporting member for 10 years. Furthermore, air leakage check must be conducted, causing the manufacturability and the operationability to be deteriorated.

Moreover, when the load is applied to the slider, the viscoelastic film projects towards the magnetic disc, causing a flow passage from the surface of the magnetic disc to be reduced. Therefore, in a structure in which a plurality of sliders are disposed to confront the same surface of the magnetic disc, the flow passage formed between the magnetic disc and the slider is reduced. As a result, a turbulence, generated due to the rotation of the magnetic disc, increases fluttering of the magnetic disc. Therefore, the characteristics of the slider to follow the surface of the magnetic disc can be deteriorated, causing the quality of a data read signal to be deteriorated.

Additionally, the viscoelastic film can be vibrated by an air flow generated due to the rotation of the magnetic disc, causing the positioning accuracy of the slider to be deteriorated.

OBJECT AND SUMMARY OF THE INVENTION

An object of the present invention is to provide a flying head slider supporting mechanism which can overcome the above-described problem and in which its slider is not vibrated and dust is not generated at the high speed access. Furthermore, turbulence due to the rotation of the magnetic recording medium can be restricted and loading/unloading operation can be easily performed and application of desired load can be easily performed.

Another object of the present invention is to provide a flying head slider supporting mechanism the structure of which can be simplified and the slider of which is capable of satisfactorily following the magnetic recording medium.

A further object of the present invention is to provide a flying head slider supporting mechanism capable of supporting a plurality of sliders.

In order to achieve the above-described objects, according to the present invention, a flying head slider supporting mechanism comprises: a rigid body disposed away from the surface of a magnetic recording medium by a predetermined distance, with an air flow passage extending through the rigid body to the surface of the magnetic recording medium, and with means for generating an air flow passing through the air flow passage toward the surface of the magnetic recording medium or generating an air flow passing from the surface. A read/write head reproduces data recorded on the magnetic recording medium or recording the same on the magnetic recording medium; a head slider disposed in the air flow and supporting the read/write head. Means support the head slider in a direction perpendicular to the surface of the magnetic recording medium in such a manner that the head slider can move relative to the rigid body, with means generating a relative movement between the head slider and the magnetic recording medium.

Other and further objects, features and advantages of the invention will be appear more fully from the following description made with reference to the drawings.

BRIEF DESCRIPTION OF THE DRAWINGS

FIGS. 20A and 20B are plan views which illustrate the sliders according to a seventh embodiment of the present invention, respectively;

FIG. 21 illustrates the actual flying state of the seventh embodiment of the present invention;

FIG. 37 is a comparative graph which illustrates the following characteristics of the slider according to the supporting mechanism according to the tenth embodiment of the present invention and that according to a conventional supporting mechanism;

FIG. 59 is a cross sectional view which illustrates a twenty-seventh embodiment of the present invention;

FIG. 60 is a cross sectional view which illustrates a twenty-eigth embodiment of the present invention;

FIGS. 63 and 64 are cross sectional views which illustrate the different states of the thirty-first embodiment of the present invention;

DETAILED DESCRIPTION OF PREFERRED EMBODIMENTS

Figure 1:
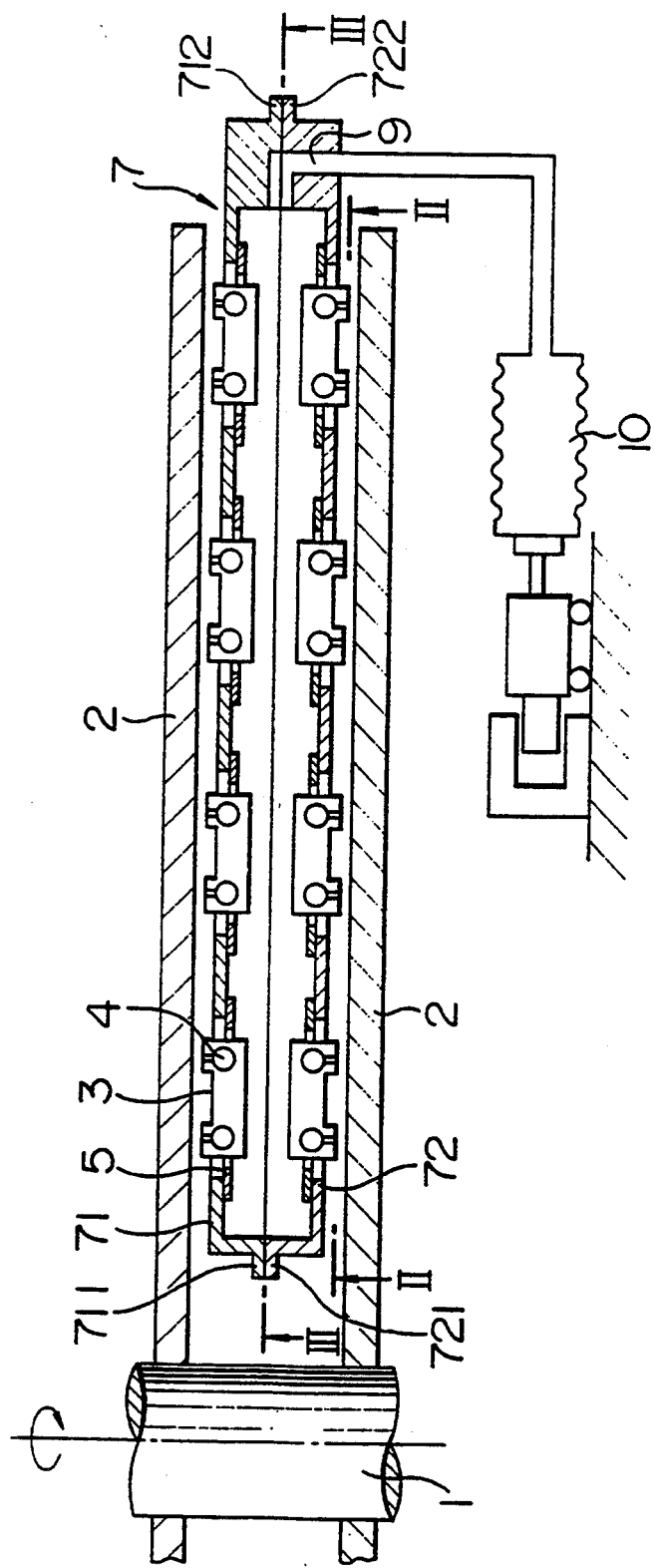
FIG. 1 is a cross sectional view of a first embodiment of the present invention.

A first embodiment of the present invention applied to a magnetic disc drive apparatus will now be described in detail with reference to FIGS. 1 to 6D. A flying head slider supporting mechanism is disposed between two neighboring magnetic discs 2 of a plurality of magnetic discs 2 secured to a rotational shaft 1. The flying head slider supporting mechanism has a plurality of negative pressure type head sliders 3 arranged in the radial direction of the magnetic discs 2 in such a manner that the sliders 3 respectively confront the two magnetic discs 2. An electromagnetic conversion or pick-up portion 4, i.e., film magnetic head, is mounted on each of the sliders 3. Each of the sliders 3 is supported by an elastic metal plate-like gimbal spring (gimbal) 5. The supporting rigidity of the gimbal 5 is sufficiently reduced so that the movement of the slider 3 is not restricted. The gimbal 5 is secured to a supporting member 7 having a satisfactory supporting rigidity. The supporting member 7 includes two channel members 71 and 72 having U-shaped cross sectional shape are connected to each other by joining their flanges 711 and 721 and the flanges 712 and 722. The supporting member 7 is fashioned as a square column having a hollow portion therein. The above-described joining is established by bolts 11. An end portion of a flow passage 9 communicates with an interior of the supporting member 7. Pressure adjusting means such as, for example, a bellows pump 10, is connected to another end portion of the flow passage 9. The pressure in the supporting member 7 is adjusted by the bellows pump 10. The above-described pressure adjustment means may include a combination of a pressure pump and a vacuum pump.

Figure 2:
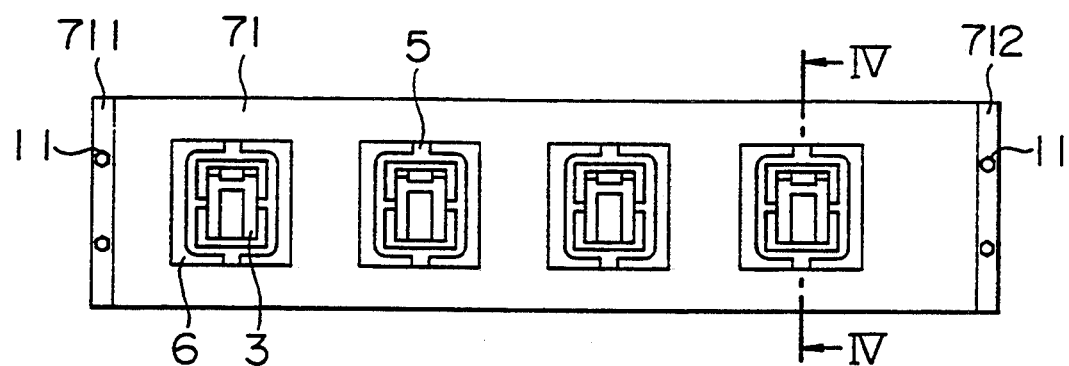
FIG. 2 is a front elevational view taken along the line II—II of FIG. 1.
Figure 3:
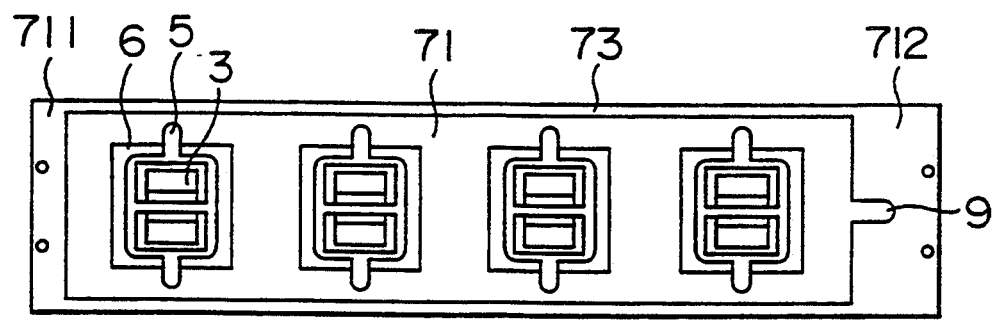
FIG. 3 is a cross sectional view taken along line the III—III of FIG. 1.

As shown in FIGS. 2 and 3, the channel member 71 has a plurality, for example, four in the illustrated embodiment, openings 6 arranged on a line in the radial direction of the magnetic disc 2. In each of the openings 6, the slider 3 is supported by the gimbal 5. The gimbal 5 and the slider 3 are joined to each other by an adhesive or the like, and the gimbal 5 is fixed to the channel member 71 by spot welding or the like.

The channel member 72 is structured similarly to the structure of the channel member 71 except for the flow passage 9.

The supporting member 7 can be moved only in the radial direction with respect to the magnetic disc 2 by drive means (not shown).

Figure 4:
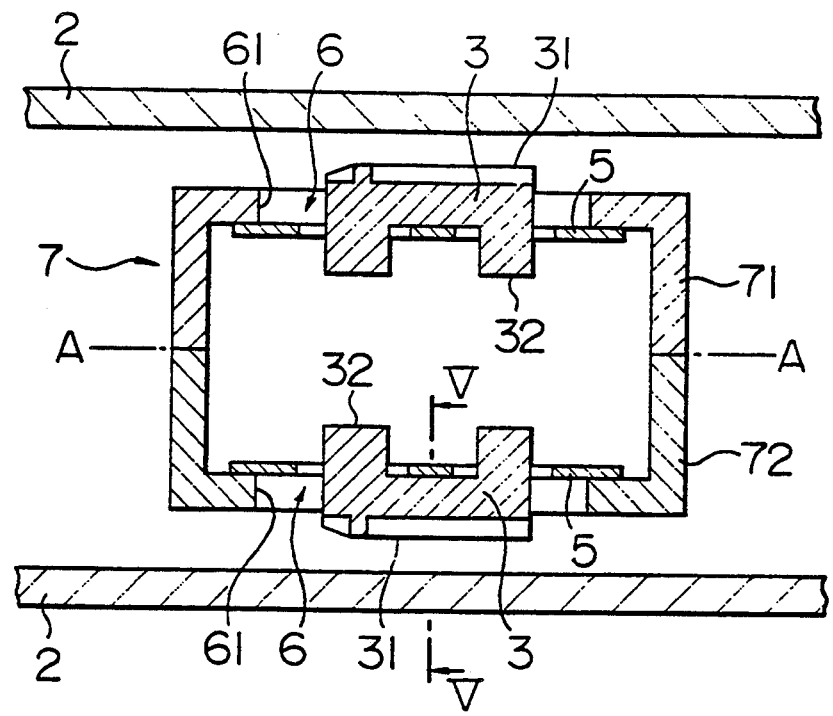
FIG. 4 is a cross sectional view taken along the line IV—IV of FIG. 2.

Referring to FIG. 4, the slider 3 is positioned away from the magnetic disc 2 when the magnetic disc 2 is unmoving. The sliders 3 are symmetrically disposed with respect to a central plane A—A. The slider 3 must be a negative pressure type slider capable of generating negative pressure in a portion between the slider 3 and the moving magnetic disc 2 due to a dynamic pressure bearing.

The negative pressure type slider and a positive pressure type slider will now be described with reference to FIGS. 31 and 32. Referring to the drawings, arrows designate the direction of an air flow created by the rotation of the magnetic disc 2.

Figure 31:
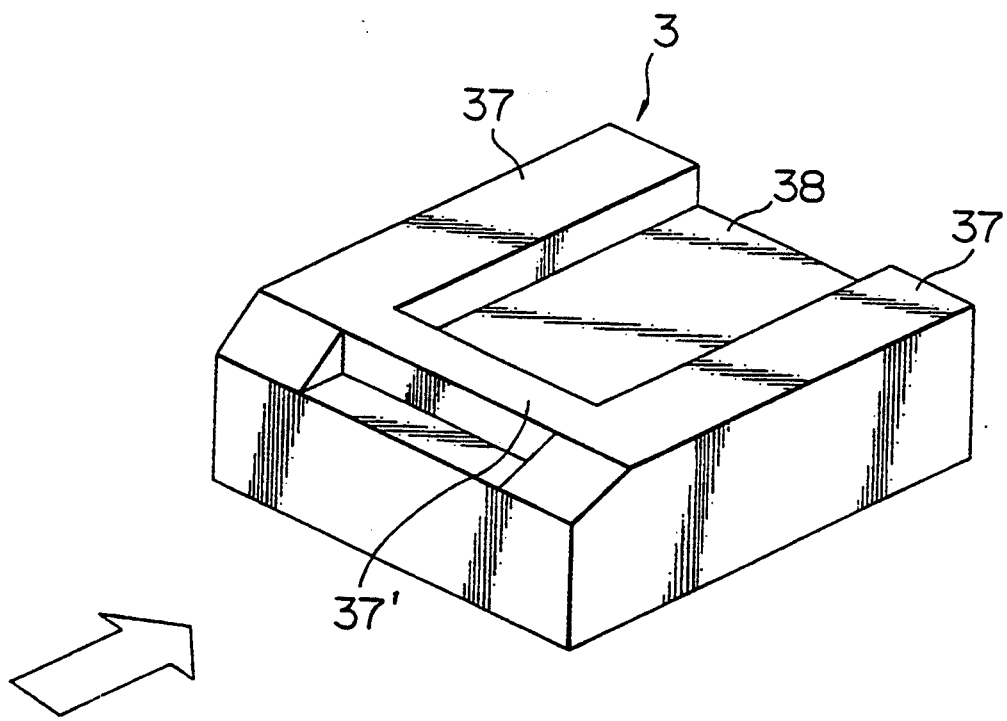
FIG. 31 is a perspective view which illustrates a negative pressure type slider.

As shown in FIG. 31, the negative pressure type slider 3 includes rails 37 disposed on two sides thereof, with the rails 37 being connected to each other by a band 37' on the air flow inlet side thereof. As a result, a negative pressure generating pocket 38 is formed. Positive pressure is generated between the rails 37 and the magnetic disc 2 due to the rotation of the magnetic disc 2, causing negative pressure to be generated in the pocket 38. When the above-described state is realized, the slider 3 is able to maintain its position of flying at which positive pressure generated at the rails 37 and negative pressure generated in the pocket 38 are balanced with each other even if the slider 3 is not pressed.

Figure 32:
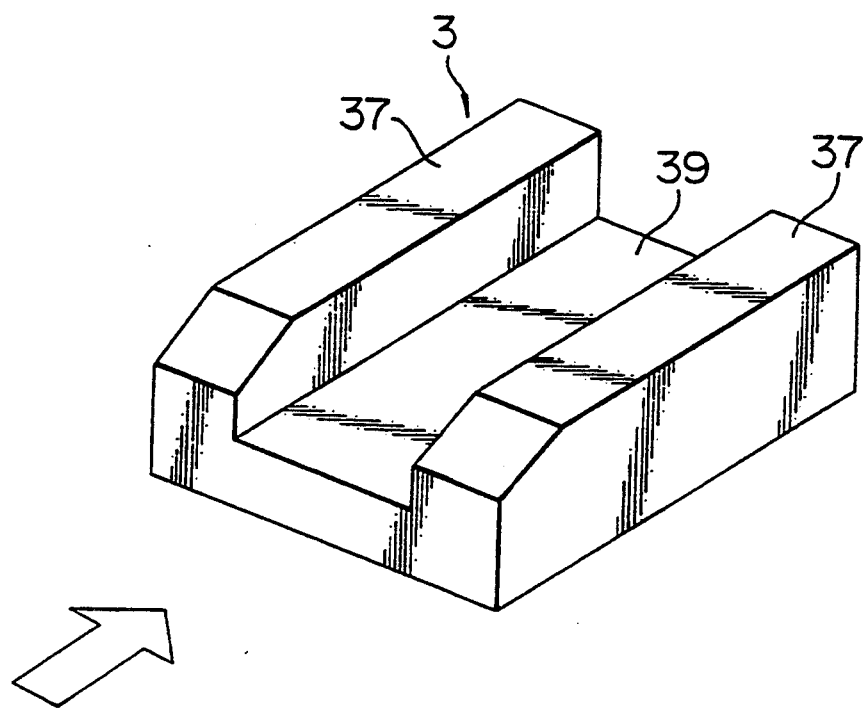
FIG. 32 is a perspective view which illustrates a positive pressure type slider.

As shown in FIG. 32, a positive pressure type slider includes an upper side adapted to confront the magnetic disc 2. When the surface of each of the rails 37 is brought close to the surface of the magnetic disc 2, positive pressure is generated between the rails 37 and the magnetic disc 2 due to an air flow created by the rotation of the magnetic disc 2. As a result, the slider 3 flies or is displaced to a position at which the thus generated positive pressure is balanced with the load applied to the slider 3. Reference numeral 39 represents a blow-by groove in which no pressure is generated.

The negative pressure type slider of the type described above is disclosed in, for example, U.S. Pat. No. 3,855,625, JP-A-58-64670, JP-A-57-210479, JP-B-59-18790 and JP-B-63-56625. The positive pressure type slider has been disclosed in, for example, JP-B-57-569.

Figure 5:
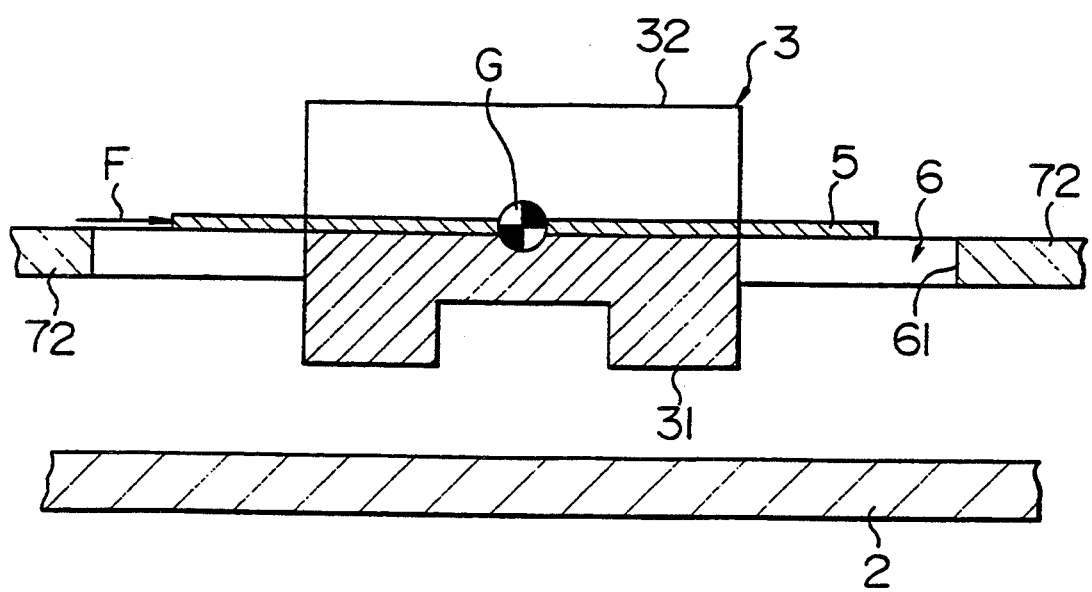
FIG. 5 is a cross sectional view taken along the line V—V of FIG. 4.

As shown in FIG. 5, the slider 3 shown in FIG. 1 is supported in the opening 6 by the gimbal 5 in such a manner that a peripheral portion 61 of the opening 6 is positioned between a outer surface 31 and a backside surface 32 of the slider 3. The gimbal 5 extends on the plane on which the center of gravity G of the slider 3 exists. Therefore, force F, generated when the supporting member, that is, the slider 3, moves in the radial direction, acts on the center of gravity G of the slider 3 via the gimbal 5. Therefore, a problem that the slider 3 is undesirably moved/vibrated during the data access can be prevented. Therefore, the slider 3 can be accurately and quickly moved to a predetermined position in the radial direction of the magnetic disc 2 at which data have been stored. As a result, a quick data access which is the most critical factor for the magnetic disc drive apparatus can be achieved. Furthermore, since four sliders 3 are placed in a row in the radial direction on the supporting member 7, the distance necessary for the slider 3 to move for data access can be reduced to one fourth with respect to the structure in which one slider is provided. Therefore, assuming that the slider accessing speed (the speed at which the slider moves in the radial direction) is the same, the access time can be shortened to one-fourth with respect to the structure in which one slider is provided.

Figure 6A:
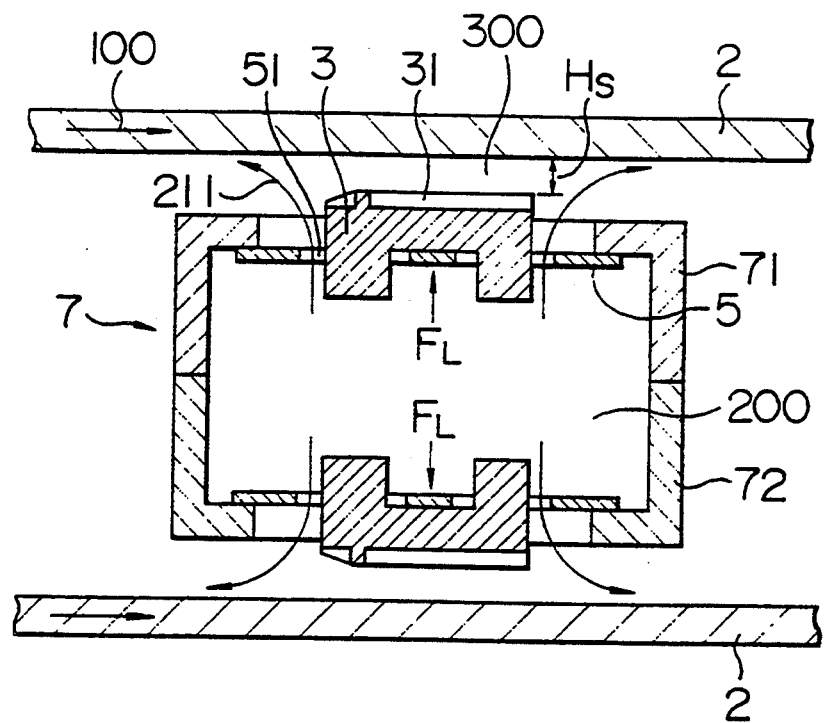
FIGS. 6A to 6D illustrate the function of the first embodiment of the present invention.
Figure 6B:
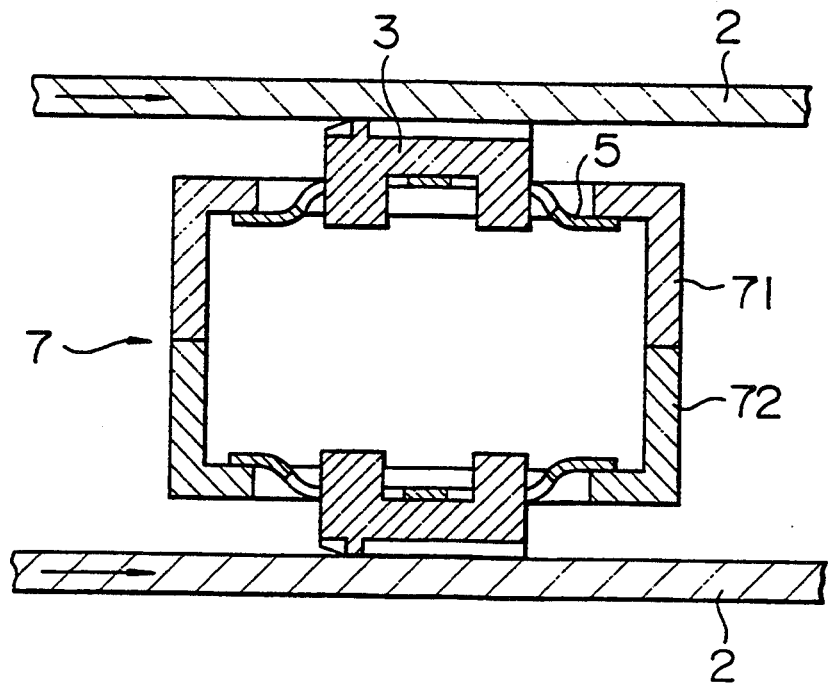

First, the loading mechanism of the slider 3 will now be described with reference to FIGS. 6A and 6B.

Before the loading operation starts, the slider 3 is held at a position away from the magnetic disk 2 by a predetermined distance $H_s$ (several tens to several hundred $\mu$m) by the gimbal 5 fixed to the supporting member 7. The distance $H_s$ is sufficient not to generate a negative pressure between the slider 3 and the magnetic disc 2 when the magnetic disc 2 is rotated. When the pressure of an internal hollow portion 200 formed in the supporting member 7 has been, in this state, raised by the bellows pump 10 shown in FIG. 1, air partially passes through a gap 51 between the slider 3 and the gimbal 5 toward the surface of the magnetic disc 2 as an air flow 211. However, pressure difference $\Delta P$ is generated between the internal hollow portion 200 and the outer portion 300 of the supporting member 7, that is, between the outer surface 31 and the backside surface 32 of the slider 3. Assuming that the area of the backside surface 32 of the slider 3 is S, loading force (pressure) $F_L$, which can be expressed as follows, acts on the slider 3:

$$F_L = \Delta P \cdot S \tag{1}$$

Since the gimbal 5 has the supporting rigidity which has been sufficiently reduced, the gimbal 5 is deformed by the above-described loading force $F_L$. Therefore, the slider 3 is brought near the surface of the rotating magnetic disc 2. Since the slider 3 is the negative pressure type slider, negative pressure is generated between the rotating magnetic disc 2 and the slider 3 when the slider 3 has been brought sufficiently close to the rotating magnetic disc 2 by, for example, a distance of a micron or less. The negative pressure thus generated acts as load $L_n$ which presses the slider 3 toward the magnetic disc 2. When once the load $L_n$ is generated due to the negative pressure, the slider 3 is maintained at a position at which the level of the negative pressure (the load) $L_n$ and that of positive pressure $L_p$ are balanced even if the pressure application to the internal portion 200 of the supporting member 7 is stopped. Thus, the loading operation is completed. As described above, when the slider 3 has been loaded above the surface of the rotating magnetic disc 2 and the state in which the slider 3 generates the load $L_n$ has been realized, the slider 3 can be maintained at a position away from the surface of the magnetic disc 2 by a predetermined distance h (in general, sub-micron order) even if the internal portion 200 of the supporting member 7 is not under pressure by the pump 10. FIG. 6B illustrates a state in which the slider 3 is flying after it has been loaded as described above.

Figure 6C:
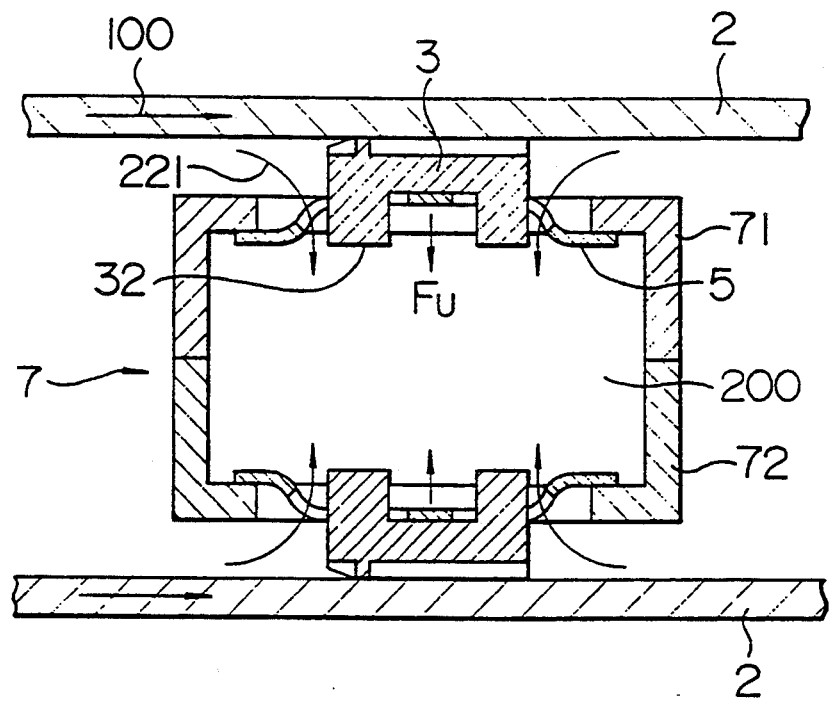
Figure 6D:
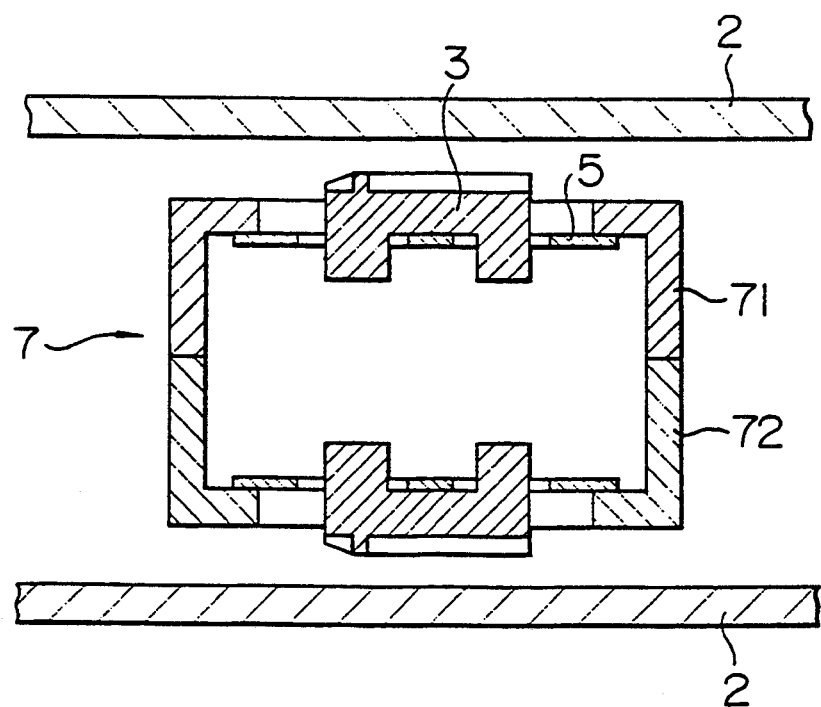

The unloading operation will now be described with reference to FIGS. 6C and 6D. Referring to FIG. 6C, when the level of the pressure in the internal portion 200 of the supporting member 7 is lowered by the pump 10, a pressure difference $\Delta P$ is generated between the outer surface 31 and the backside surface 32 of the slider 3 although a small quantity air introduction 221 from the opening 6 into the internal portion 200 of the supporting member 7 cannot be prevented. The pressure difference $\Delta P$ thus generated can act as an unloading force $F_U$ in a direction in which the slider 3 is brought away from the surface of the magnetic disc 2. Therefore, if an unloading force $F_U$ is obtained which is larger than load $L_n$ generated due to the above-described negative pressure e.g. which meets the following equation:

$$|F_U(=DP \cdot S)| \geq |L_n| \tag{2}$$

it becomes possible to bring the slider 3 away from the disc 2. Therefore, the slider 3 can be brought to a position at which no negative pressure and positive pressure are generated between the outer surface 31 of the slider 3 and the surface of the rotating magnetic disc 2 due to the effect of the dynamic pressure air bearing.

As described above, the unloading operation is completed. FIG. 6D illustrates the positional relationship between the slider 3 which has been unloaded and the magnetic disc 2.

In order to perform the unloading, the pressure difference $\Delta P$ which can meet Equation (2) must be generated by the pump 10. The rotational speed N of the magnetic disc 2 and the load $L_n$ acting on the slider 3 hold the following proportional relationship:

$$L_n \propto N^n (n > 0) \tag{3}$$

Therefore, the unloading can be performed by a smaller pressure difference $\Delta P$ by lowering the rotational speed N of the magnetic disc 2 to a speed lower than that at the time of starting the operation of the magnetic disc drive apparatus and thereby reducing $L_n$ before lowering the pressure level in the supporting member 7. As a result, the size of the pump 10 can be lowered.

As described above, when the operation of the magnetic disc 2 is stopped, the slider 3 is positioned at the unloaded position at which it is positioned apart from the magnetic disc 2. Consequently, disc adhesion can be prevented. Furthermore, since the slider 3 and the magnetic disc 2 are spaced from each other when the operation of the magnetic disc 2 is stopped, the probability of the adhesion due to the lubricant can be eliminated, and thereby a large quantity of lubricant can be applied to the surface of the magnetic disc 2. Therefore, even if the magnetic disc 2 and the slider 3 are brought into contact with each other, the large quantity of lubricant can protect the magnetic disc 2 and data written on the magnetic disc 2 can thereby be protected from a damage.

A second embodiment of the present invention will now be described with reference to FIGS. 22 and 23. The difference from the first embodiment lies in that a positive pressure type slider as disclosed in JP-B-57-569 is employed. The positive pressure type slider is, differing from the negative pressure type slider, arranged in such a manner that only positive pressure is generated between the outer surface of the slider and the surface of the rotating magnetic disc by utilizing the principle of the dynamic pressure air bearing. According to this embodiment, when the operation of the magnetic disc 2 is stopped, the slider 3 is supported by the gimbal 5 so as to be in contact with the surface of the magnetic disc 2. A pump 11, capable of continuously applying pressure via a filter 400, communicates with one end portion of the flow passage 9 which is communicated at the other end portion thereof with the interior of the supporting member 7. When the magnetic disc 2 begins to rotate and a predetermined rotational speed has been realized, positive pressure is generated between the outer surface 31 of the slider 3 and the magnetic disc 2. Therefore, a force $L_P$ is generated with which the slider 3 is separate from the surface of the magnetic disc 2. In this state, the continuous pressure application pump 11 is operated so that high pressure air is supplied via the filter 400 to the internal hollow portion 200 of the supporting member 7 through the flow passage 9. As a result, although air is partially discharged from the supporting member 7, a pressure difference $\Delta p$ is generated between the backside surface 32 and the outer surface 31 of the slider 3. Assuming that the area of the backside surface 32 of the slider 3 is S, load $F_L$ (FIG. 23) with which the slider 3 is pressed toward the surface of the magnetic disc 2 is expressed by the following equation:

$$F_L = S \cdot \Delta p \tag{4}$$

The slider 3 is therefore moved so as to be spaced from the disc surface to a position at which the level of the above-described positive pressure $L_P$ is balanced with the load $F_L$. Therefore, the slider 3 can be maintained at a position apart from the surface of the magnetic disc 2 by a predetermined distance L by continuously applying pressure from the pump 11 during the rotation of the disc 2, that is the operation of the magnetic disc 2. Furthermore, since $F_L$ can be easily changed by adjusting $\Delta p$ as shown in Equation (4), the distance between the slider 3 and the surface of the magnetic disc 2 can be controlled by adjusting the output from the pressure pump 11. Since the positive pressure type sliders of the type disclosed in JP-B-57-569 can be easily formed by machining and are widely used, an advantage can be obtained from this embodiment in that the sliders can be easily manufactured with a low cost.

Furthermore, if a heating means is provided in the passage 9 for the purpose of supplying hot air to each of the sliders 3 so as to vaporize water between the magnetic disc 2 and slider 3, the adhesion can be prevented.

According to the second embodiment, the unloading type slider 3 is employed which is arranged in such a manner that the slider 3 is positioned in contact with the magnetic disc 2 when the operation of the magnetic disc 2 is stopped and the operation of the magnetic disc 2 is started with the above-described contact state maintained. Therefore, if the heating means is not provided, there is a possibility of the adhesion occurring due to the accumulaton of moisture, i.e. waterdrops between the slider 3 and the magnetic disc 2 during the stoppage of the operation. Therefore, it is feasible to employ a modification to the second embodiment by employing an auto-loading type slider. That is, according to this modification, the structure is arranged to be the same as that shown in FIGS. 22 and 23. The slider 3 is spaced from the magnetic disc 2 by a predetermined distance (with which, even if the magnetic disc 2 is rotated, air flow generated due to the rotation does not apply positive pressure to the slider 3) when the operation of the magnetic disc 2 is stopped. After the rotation of the magnetic disc 2 has been started, air under pressure is injected into the internal portion 200 of the supporting member 7 by the pump 11, causing the pressure difference to be generated between the backside surface of the slider 3 and the outer surface of the same. The pressure difference thus generated causes the slider 3 to be brought to a position close to the magnetic disc 2, at which the positive pressure, generated due to the air flow created by the rotation of the magnetic disc 2, acts on the slider 3. Thus, the loading is completed. Then, similarly to the operation performed according to the second embodiment, air under pressure is continuously supplied from the pump 11 during the operation. On the contrary, the unloading can be established by stopping the supply of air under pressure from the pump 11.

Figure 7:
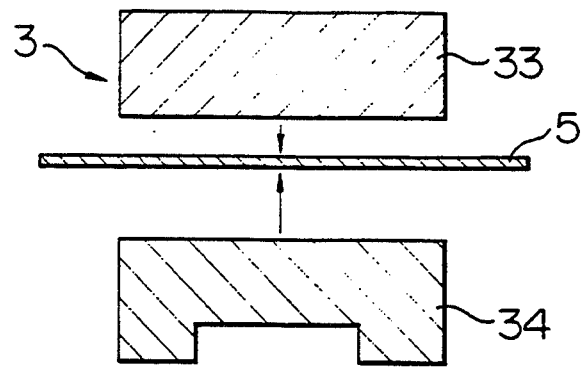
FIGS. 7 and 8 illustrate the manner of assembling a slider and a gimbal according to a third embodiment of the present invention.
Figure 8:
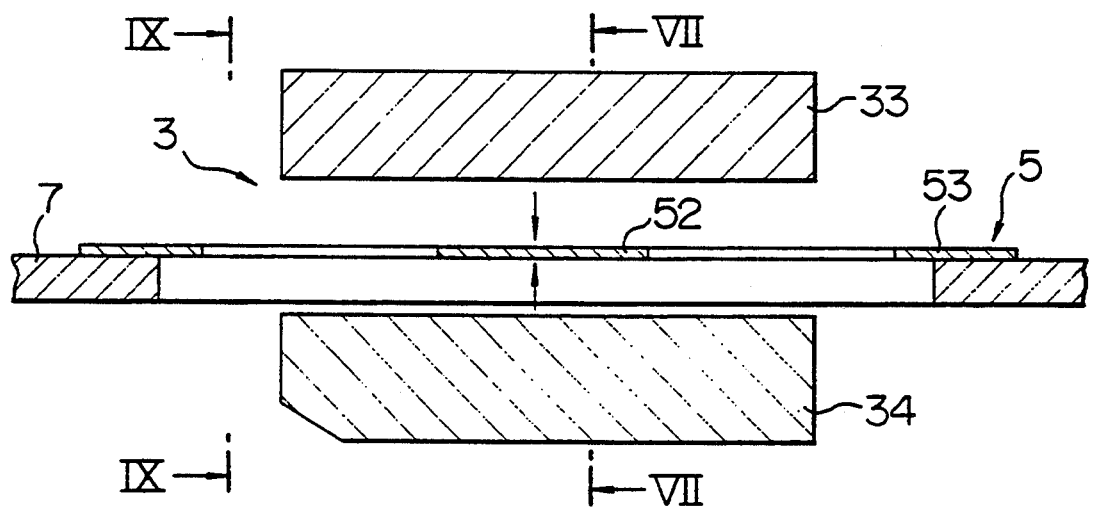
Figure 9:
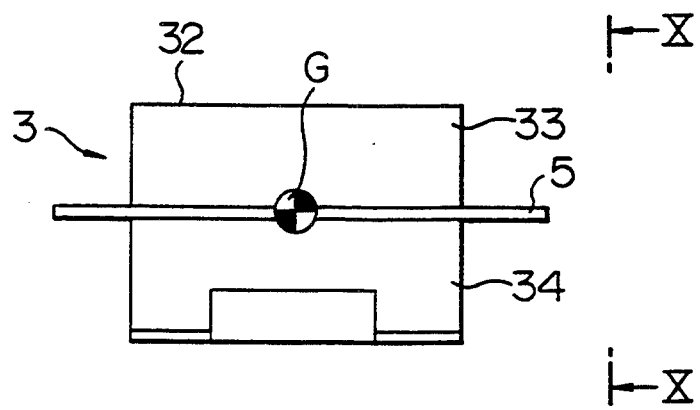
FIGS. 9 to 11 are a front elevational view, a side elevational view and a top view of a second embodiment of the present invention, respectively.
Figure 10:
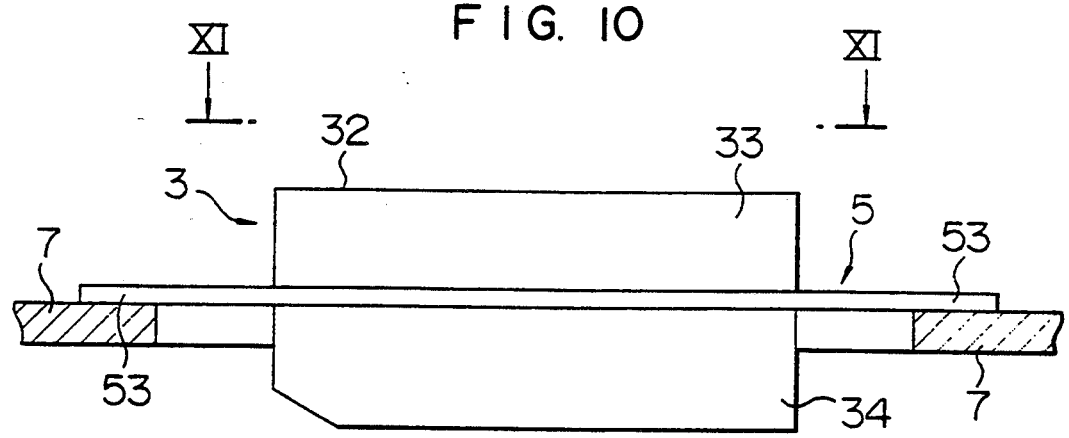
Figure 11:
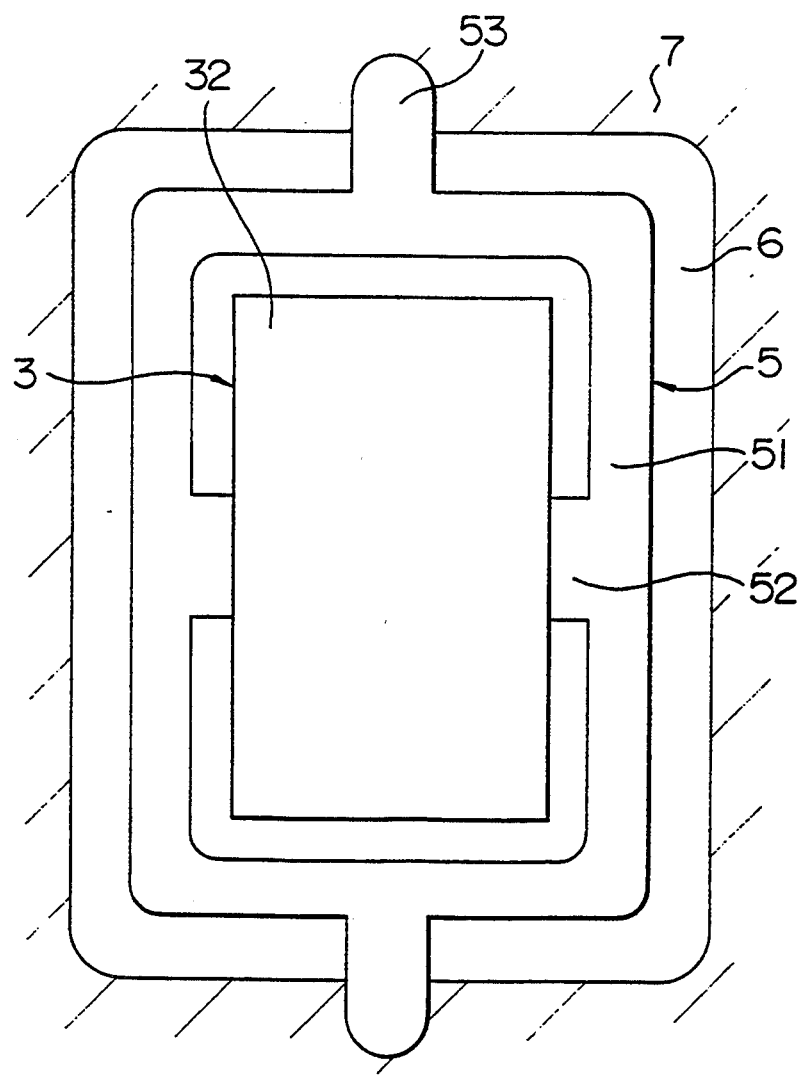

The difference between the first embodiment and a third embodiment of the present invention lies in the structure for fastening the gimbal 5 to the slider 3. As shown in FIGS. 7 and 8, the slider 3 is divided into a slider backside member 33 and a slider outer member 34. The gimbal 5 is thus held between the above-described two elements. As shown in FIG. 11, the gimbal 5 has a rectangular annular frame 51, a central portion 52 connecting the two side portions thereof and projections 53 projecting over the other side portions thereof. The central portion 52 is held between the slider backside member 33 and the slider outer member 34. The projection 53 of the gimbal 5 is fastened to the supporting member 7 by spot welding. The slider 3 is divided in such a manner that the gimbal 5 is located in a plane which includes the gravity center G of the slider 3, as apparent from FIGS. 9 and 10.

According to this embodiment, the slider 3 can be easily and reliably fastened to the gimbal 5. Even when the height (the thickness) of the slider 3 is low, the gimbal 5 can be easily located in the plane which extends through the center of gravity G of the slider 3 and parallel to the outer surface of the slider 3. Also according to this embodiment, effects similar to the first embodiment of the present invention can, of course, be obtained.

Figure 12:
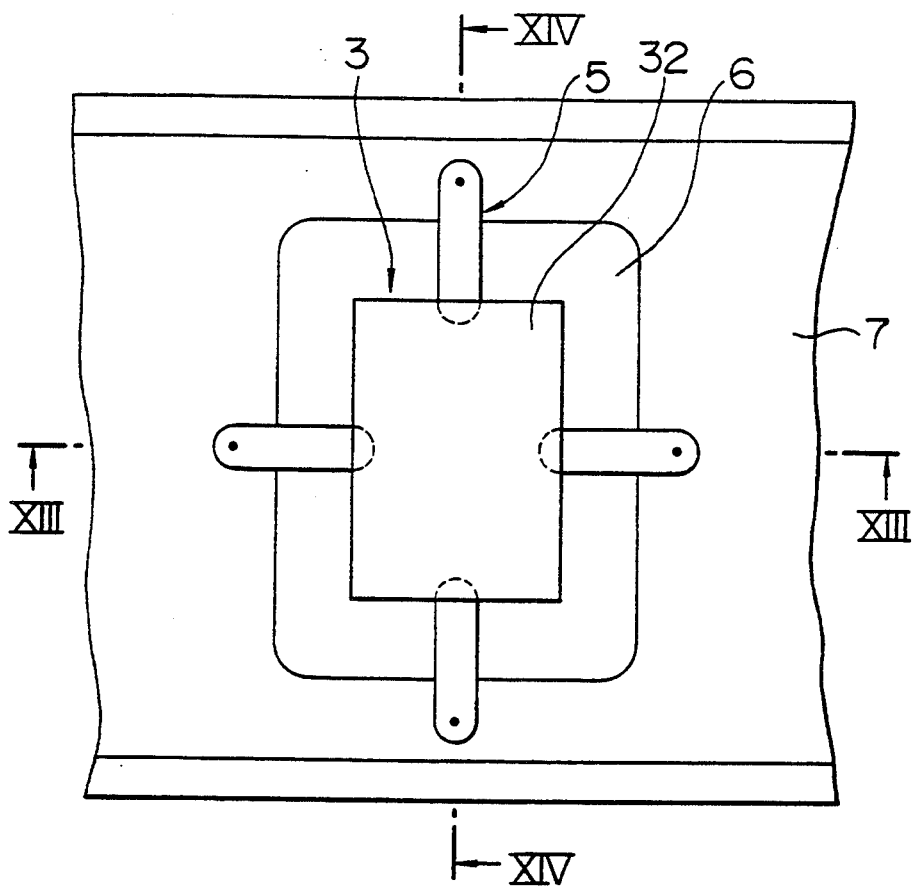
FIG. 12 is a fragmentary top view which illustrates a fourth embodiment of the present invention.
Figure 13:
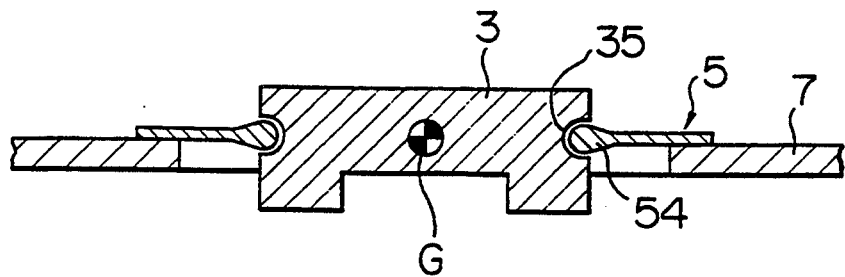
FIGS. 13 and 14 are cross sectional views taken along the line XIII—XIII and the line XIV—XIV of FIG. 12, respectively.
Figure 14:
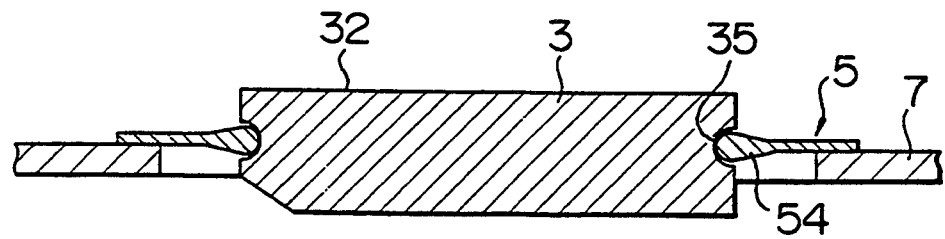
Figure 15:
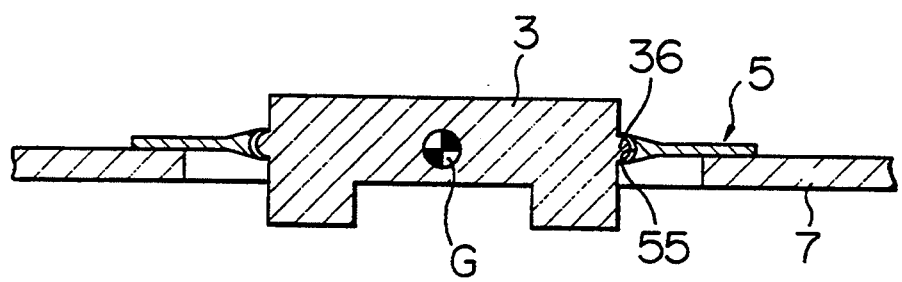
FIG. 15 is a fragmentary cross sectional view which illustrates a modification of the fourth embodiment of the present invention.

A fourth embodiment of the present invention will now be described with reference to FIGS. 12 to 14. According to the fourth embodiment, the structure of the gimbal 5 and the structure for fastening the gimbal 5 to the slider 3 differ from the first embodiment of the present invention. As shown in FIGS. 13 and 14, the side surface of the slider 3 is provided with a recessed portion 35 for the gimbal 5. Each of four leaf-members has a one end portion secured to the supporting member 7 and the other end portion introduced into the recessed portion 35. The other end portion has a rounded projection 54 which is fitted into the slider 3. The above-described four leaf-members constitute the gimbal 5. The gimbal 5 is mounted onto a plane which runs parallel to the outer surface of the slider 3 through the gravity center G of the slider 3. According to this embodiment, since the slider 3 can be fitted to the gimbal 5 the slider 3 can be easily mounted to the gimbal 5. According to this embodiment, effects similar to those obtainable from the first embodiment can, of course, be obtained. As shown in FIG. 15, another structure may be employed in which a projection 36 is formed on the side surface of the slider 3 and a recessed portion 55 is formed in each of the leaf-members of the gimbal 5.

Figure 16:
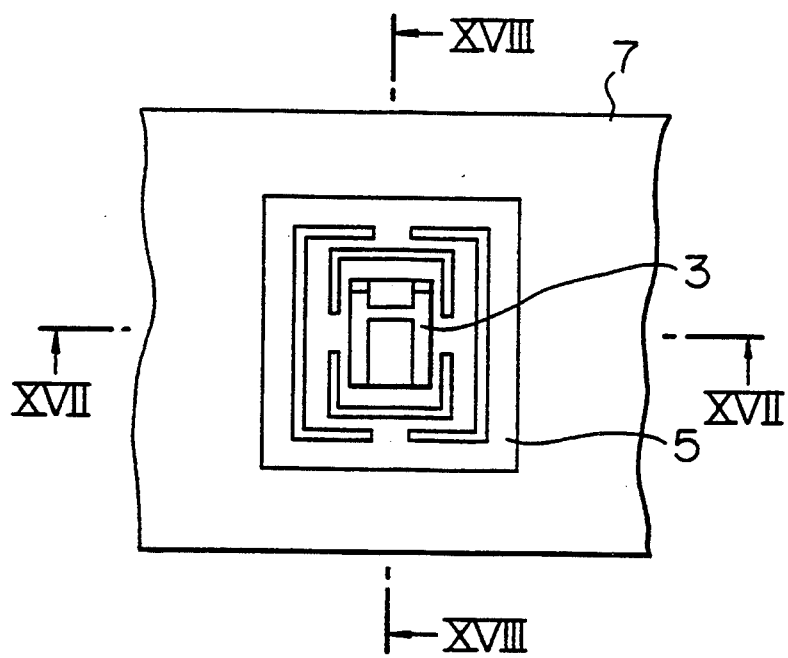
FIG. 16 is a front elevational view which illustrates a fifth embodiment of the present invention.
Figure 17:
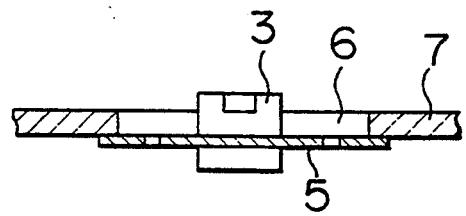
FIGS. 17 and 18 are cross sectional views taken along the line XVII—XVII and the line XVIII—XVIII of FIG. 16, respectively.
Figure 18:
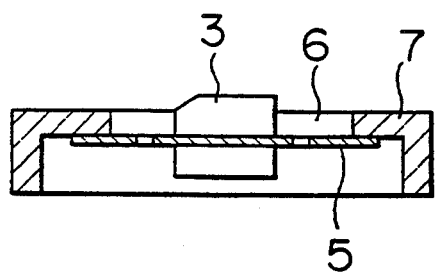

FIGS. 16 to 18 illustrate a fifth embodiment of the present invention in which the shape of the gimbal 5 is different from that according to the first embodiment of the present invention. The gimbal 5 has a plurality of symmetrically disposed slits. Since the gimbal 5 can be reliably supported even if the supporting rigidity is reduced, the deterioration in the flying characteristics of the slider 3 due to the fastening of the gimbal 5 can be significantly prevented. Also according to fifth embodiment, effects similar to those obtainable in the first embodiment of the present invention can, of course, be obtained. The shape and the structure of the gimbal 5 are not limited to the illustration so long as the pitching, the rolling and the vibration of the slider 3 in a direction perpendicular to the surface of the magnetic disc are not prevented.

Figure 19:
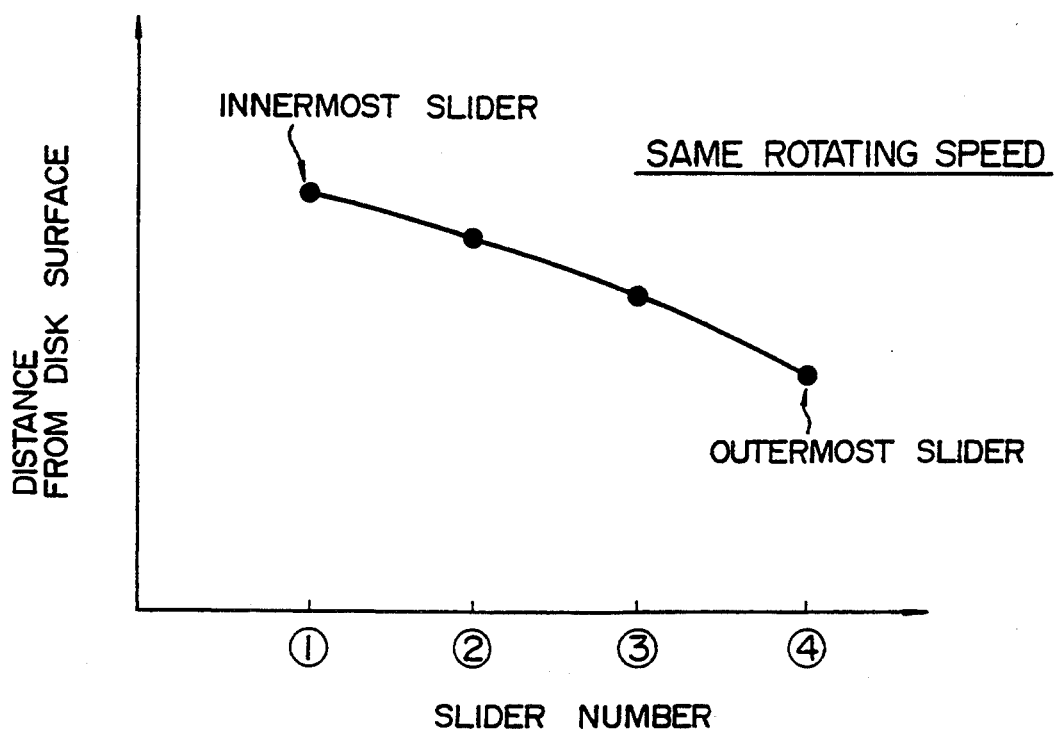
FIG. 19 illustrates flying characteristics of the slider according to a sixth embodiment of the present invention.

A sixth embodiment of the present invention will now be described with reference to FIGS. 19 to 21. According to the first embodiment of the present invention, the plurality of sliders 3 mounted on the supporting member 7 have the same shape and dimension. However, the rotating speeds of the magnetic disc 2 with respect to the sliders 3 become different since the radial distances between the sliders 3 and the axis of the magnetic disc 2 are different from one another. The slider 3 has the characteristic that the actual distance between the slider 3 and the disc surface is proportional to the rotating speed of the magnetic disc 2 with respect to the slider 3. Therefore according to the first embodiment of the present invention, a problem arises in that the slider positioned at a relatively radial inner portion and that positioned at a relatively radial outer portion are undesirably flown by different distances. An object of the sixth embodiment of the present invention is to overcome the above-described problem. The structural difference from the above-described first embodiment will now be described.

First, the innermost slider is given number ①  and the other sliders are successively given numbers ②, ③, and ④ in dependence upon the distance from a center of the magnetic disc 2. Assuming that the rotational speeds of the magnetic disc 2 with respect to the sliders ①, ②, ③ and ④ are the same, the flying characteristics of each of the sliders 3 (which are the negative pressure type slider according to this embodiment) are determined in such a manner that the distance between the slider 3 and the surface of the magnetic disc 2 becomes large according to the distance from the outer periphery of the magnetic disc 2 as shown in FIG. 19. In order to achieve this, a width $R_1$ of the rail 37 (a positive pressure generating rail) of the innermost slider ① is larger than a width $R_4$ of the rail 37 of the outermost slider ④, while a width $N_1$ of the negative pressure generating pocket 38 is less than a width $N_4$ of the outermost slider ④. The sliders ② and ③, disposed between the sliders ① and ④, are successively arranged to have the dimensions to meet the above-described relationships. As a result, the flying characteristics as shown in FIG. 19 can be obtained. The above-described flying characteristics shown in FIG. 19 may be obtained by another means.

When the magnetic disc 2 is rotated at a predetermined speed according to the sixth embodiment of the present invention, the actual rotating speeds of the magnetic disc 2 with respect to the respective sliders ①, ②, ③ and ④ proportionally differ to the radial distances between the center of the magnetic disc 2 and the sliders ①, ②, ③ and ④. Therefore, since the slider flying characteristics shown in FIG. 19 are provided, the actual distances of the sliders ①, ②, ③ and ④ from the disc surface are the same as shown in FIG. 21. Therefore, the signal read and write performance of the slider 3 coincide with each other. Furthermore, a problem, arises in that a specific slider 3 contacts the magnetic disc 2 and is damaged, however, such contact can be prevented even if the distance between the slider 3 and the surface of the magnetic disc 2 is reduced by a disturbance. The reason for this lies in that the flying sliders 3 are positioned at the same distance from the surface of the magnetic disc 2. Therefore, the reliability of the apparatus can be satisfactorily improved. Since the basic structure according to this embodiment is the same as the structure of the first embodiment according to the present invention, effects similar to those according to the first embodiment according to the present invention can, of course, be obtained.

Figure 24:
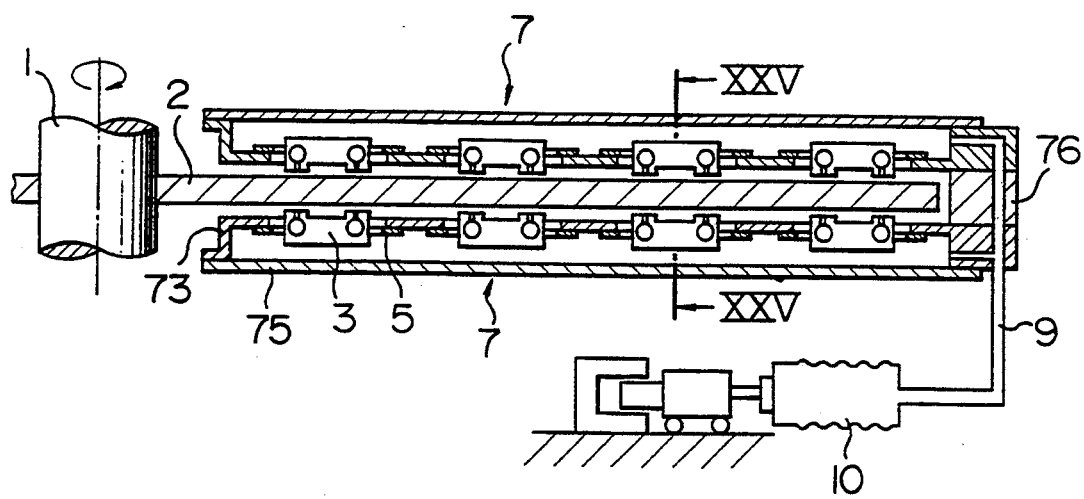
FIG. 24 is a cross sectional view which illustrates the seventh embodiment of the present invention.
Figure 25:
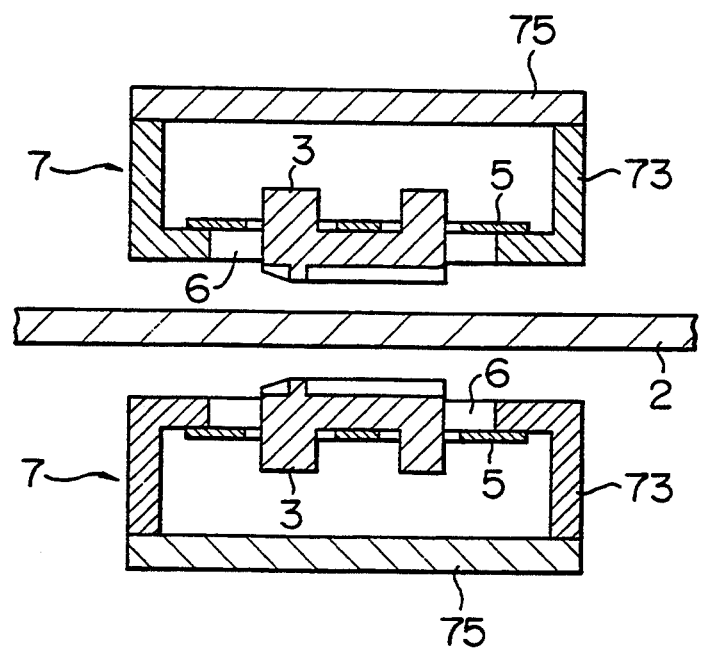
FIG. 25 is a cross sectional view taken along the line XXV—XXV of FIG. 24.
Figure 26:
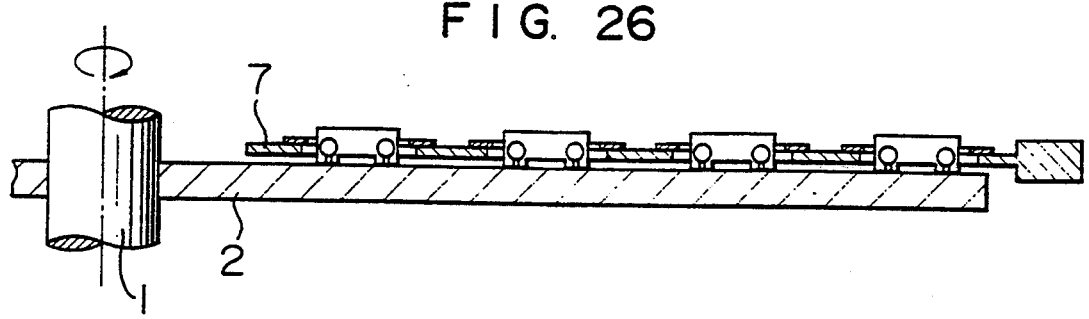
FIG. 26 is a cross sectional view which illustrates an eighth embodiment of the present invention.

FIGS. 24 and 25 illustrate a seventh embodiment of the present invention in which the structure of the supporting member 7 is different from that according to the first embodiment wherein the supporting member 7 is constituted by combining the channel members 71 and 72 and the sliders 3 are mounted on the opposite sides of the supporting member 7. According to this embodiment, the supporting member 7 is in the form of a rectangular column constituted by combining a U-shaped channel member 73 and a flat cover plate 75. Furthermore, the sliders 3 are mounted on one of the side surfaces of the supporting member 7. As a result, the slider supporting mechanism according to this embodiment can be applied to a magnetic disc drive apparatus having only one magnetic disc 2. Two supporting members 7, each of which includes the channel member 73 and the cover plate 75, are spaced from each other through a spacer 76 so as to confront the opposite surfaces of the magnetic disc 2. One end portion of the flow passage 9 communicate with the two supporting members 7 and the other end portion of the same communicate with a pressure adjusting means 10. As a result, it becomes possible to access data written on the opposite sides of a single magnetic disc 2 of a magnetic disc drive apparatus. An outer end portion (the right end portion when viewed in the drawing) of the supporting member 7 is connected to drive means which moves the overall body of the supporting member 7 radially. According to this embodiment, the negative pressure type slider 3 is employed similarly to the first embodiment of the present invention. A positive pressure type slider may be employed similarly to the second embodiment of the present invention.

Figure 27:
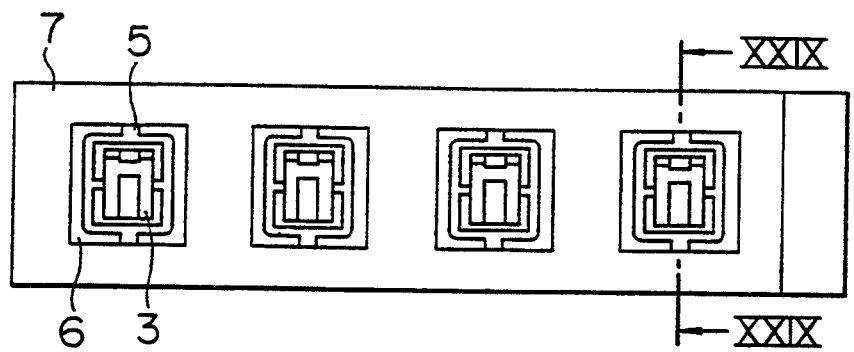
FIG. 27 is a top view which illustrates the eighth embodiment of the present invention.
Figure 28:
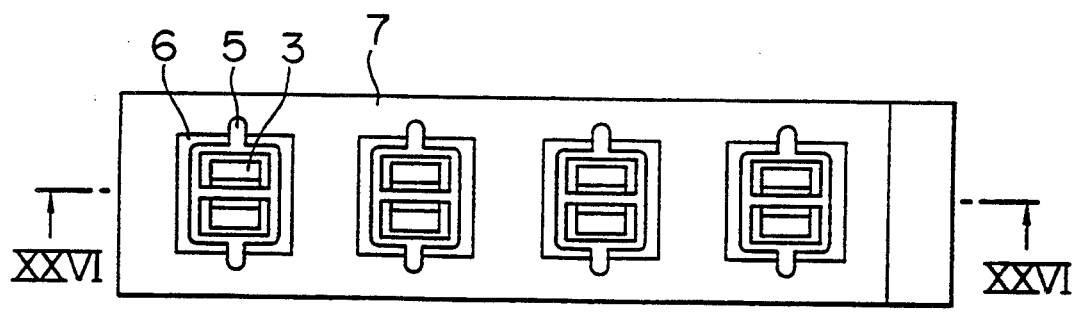
FIG. 28 is a rear view of the eighth embodiment of the present invention.
Figure 29:
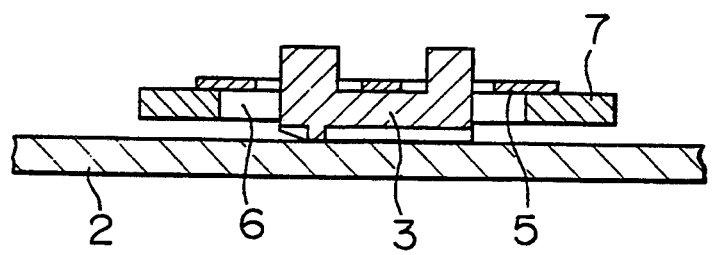
FIG. 29 is a cross sectional view taken along the line XXIX—XXIX of FIG. 27.

FIGS. 26 to 29 illustrate an eighth embodiment of the present invention with the difference between this embodiment and the previous embodiments of the present invention resides in the fact that the supporting member 7 is in the form of a flat plate having no hollow portion and no pressure adjusting means. The supporting member 7 is, as shown in FIG. 27, provided with the same number of openings 6 as that of the sliders 3. The slider 3 is mounted within the opening 6 by the gimbal 5 which passes through the center of gravity G of the slider 3.

According to the eighth embodiment, since the supporting member 7 is not a closed structure, the loading cannot be performed by applying back pressure to the slider 3. Therefore, a contact start and stop system is employed in which the slider 3 is brought into contact with the magnetic disc 2 by the elastic force of the gimbal 5 at the stop of the operation. According to the eighth embodiment, although the slider adhesion may take place, the overall weight of the supporting mechanism can be reduced. Therefore, an advantage can be obtained in that the size of the drive means for moving the slider supporting mechanism in the radial direction can be reduced. Although the negative pressure type slider is employed according to the eighth embodiment, the positive pressure type slider may be employed.

Figure 30:
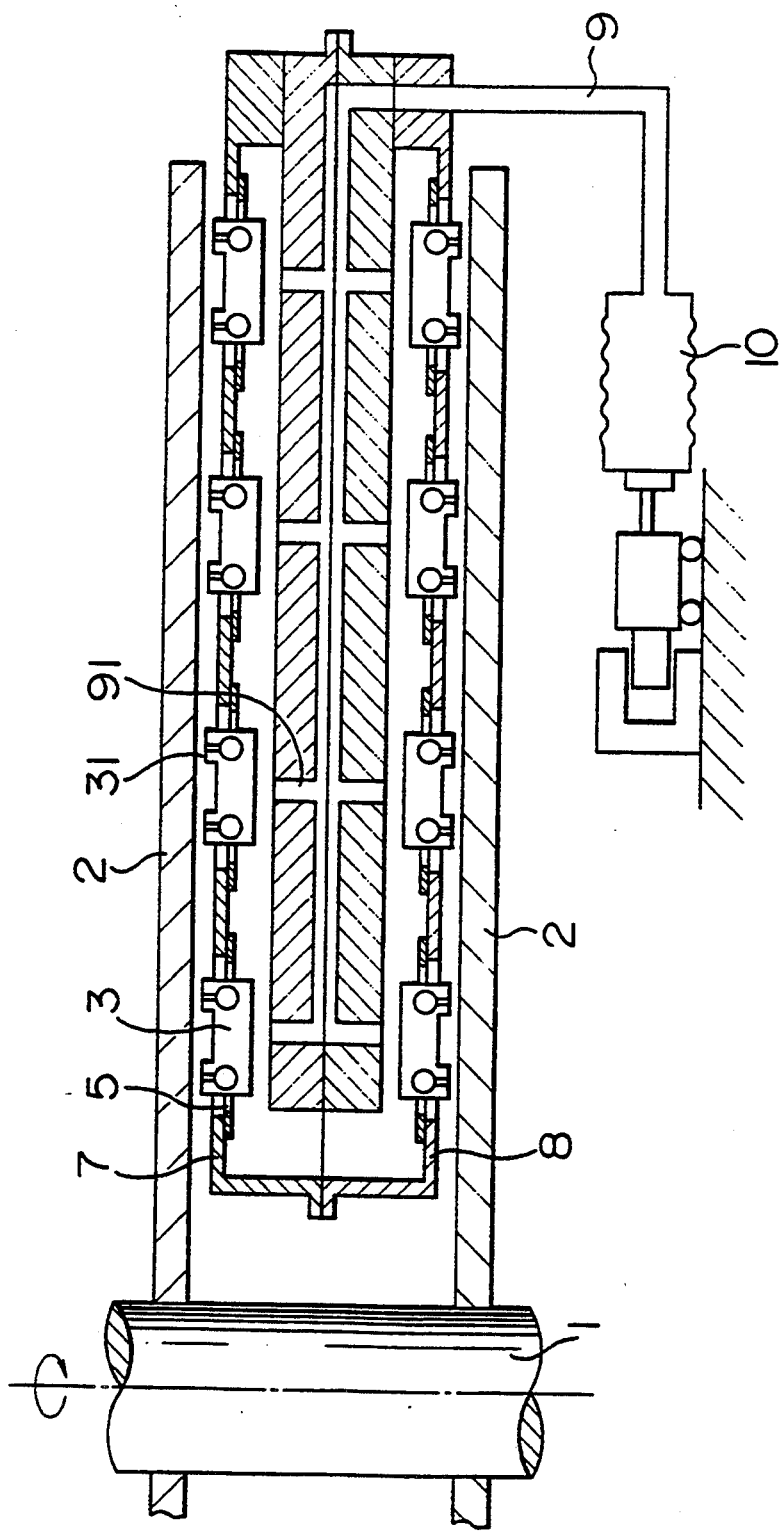
FIG. 30 is a cross sectional view which illustrates a ninth embodiment of the present invention.

According to the ninth embodiment of FIG. 30, the flow passage 9 is extended within the supporting member 7 to the innermost slider 3. Furthermore, a nozzle 91 is so provided as to confront each of the backsides of the sliders 3. As a result, air under pressure supplied from the pump 10 can be directly introduced into the backsides of the sliders 3. Therefore, effects similar to those according to the first embodiment of the present invention can be obtained even if the pump 10 has poor pressure applying capability. As a result, an advantage can be obtained in that the size of the pump 10 can be reduced.

Figure 22:
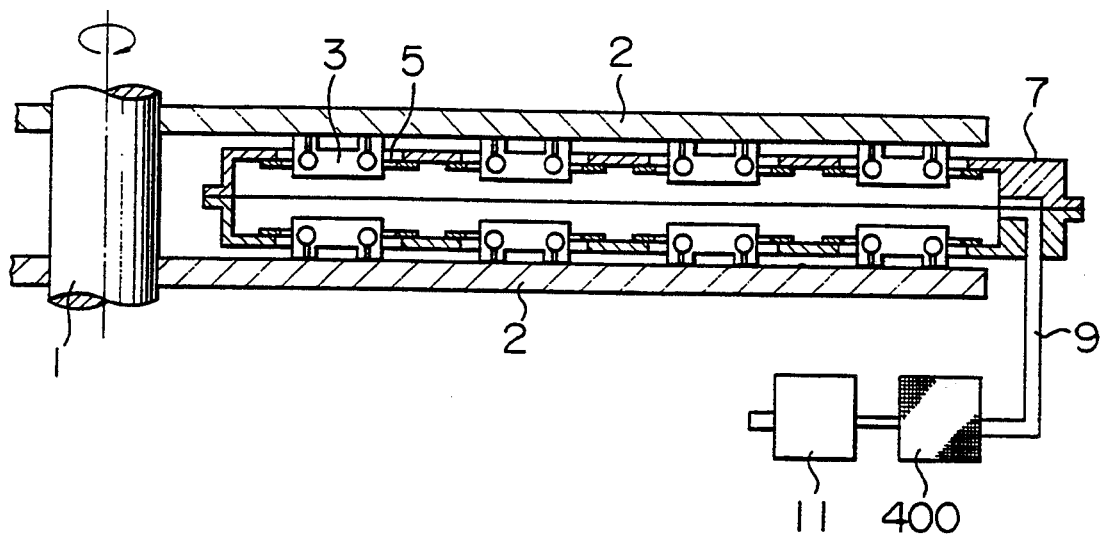
FIGS. 22 and 23 are cross sectional views which illustrate the second embodiment of the present invention.
Figure 23:
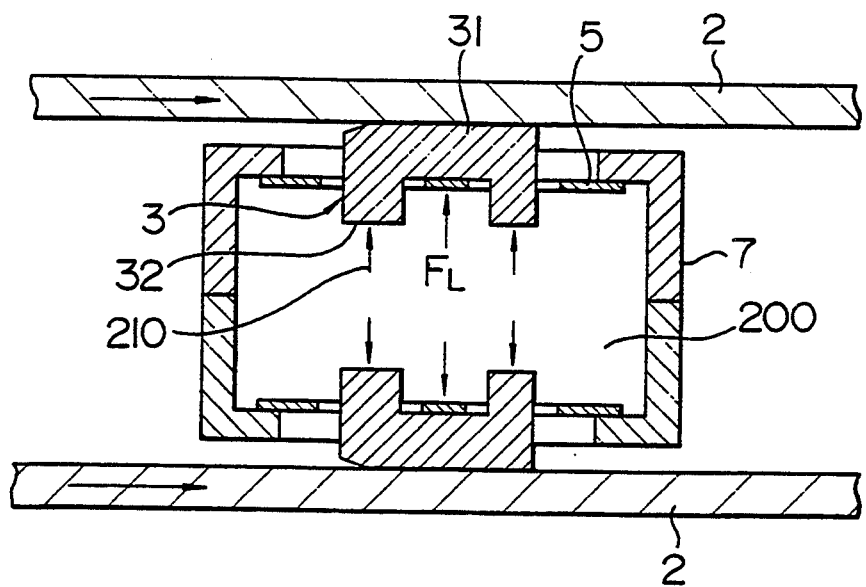

If the pump 11 shown in FIG. 22 is employed as an alternative to the pump 10, the structure according to ninth embodiment can be applied to the case in which the positive pressure type slider is employed.

In the above-described embodiments, the gimbal 5 may be made of a super-elastic alloy which is, in general, a shape memory alloy such as Ni—Ti alloy, Cu—Al—Ni alloy and Cu—Sn—Al alloy. The super-elastic alloy enters a super-elastic range from an elastic range when deformation is increased from zero. The ratio (increase of stress)/(increase of deformation) in the super-elastic range is considerably small with respect to that in the elastic range. Furthermore, the super-elastic alloy is characterized in that deformation returns to zero when the stress has been removed. Therefore, a further improved effect can be obtained if the super-elastic alloy is employed to make the gimbal 5.

Figure 42A:
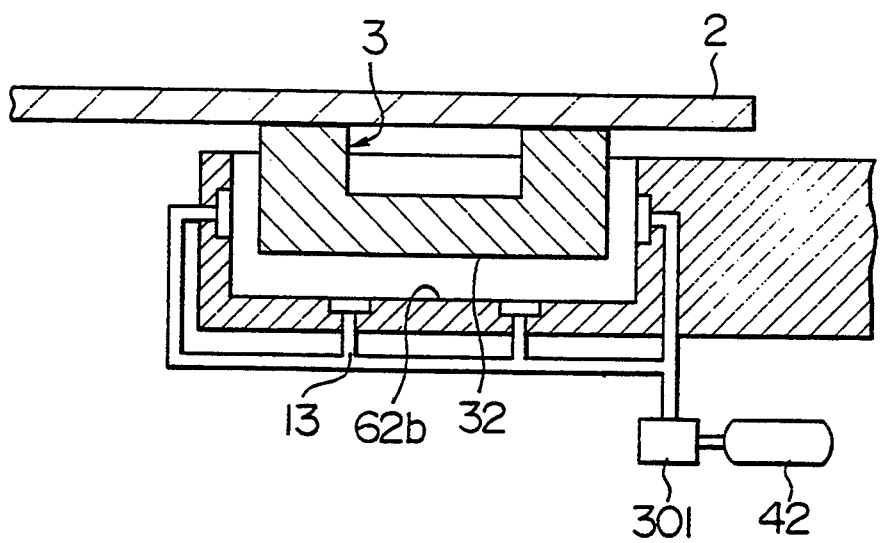
FIGS. 42A and 42B are Cross sectional views which respectively illustrate the unload and the load states according to a thirteenth embodiment of the present invention.
Figure 42B:
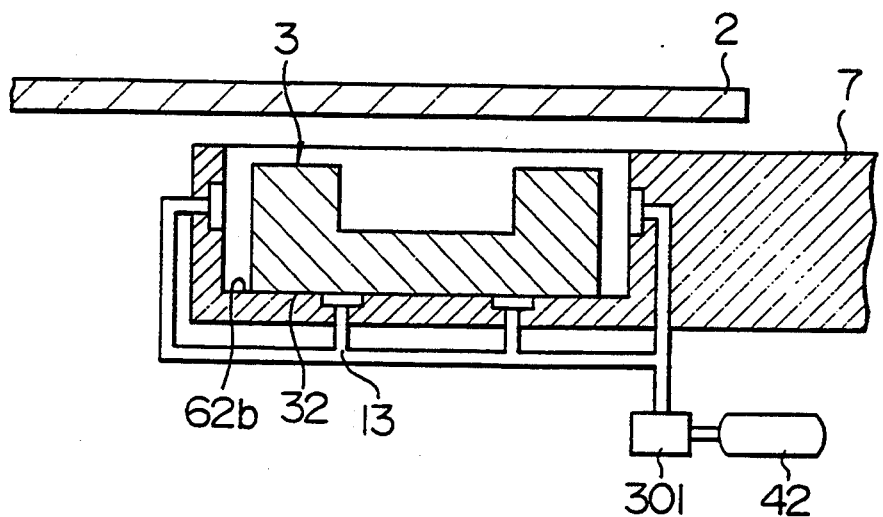

Referring to FIGS. 33 to 36, a tenth embodiment of the present invention comprises a head slider 3, a slider supporting arm 7 serving as a slider supporting member, a recessed portion 62 formed in the slider supporting arm 7 and an air duct 13 for supplying and discharging air to and from the recessed portion 62. Reference numeral 100 represents a magnetic disc rotating direction and 101 represents a direction of a seeking operation performed by the head slider 3. The supporting mechanism further comprises air jetting holes 12a, 12b and 12c, dust catching means 30, for example, a filter 301 and pressure adjusting means 40 capable of raising and lowering the pressure level. According to this embodiment, the pressure adjusting means 40 comprises a pressure application pump 41. The air jetting holes 12a and 12b are, as illustrated, formed in the walls 62a and 62c of the recessed portion 62 and a bottom surface 62b of the same so as to be communicated with the pump 41 via the air duct 13 and the filter 301. The slider 3 is supported in the recessed portion 62 formed in the supporting arm 7 in such a manner that the slider 3 does not come in contact with any surface of the recessed portion 62 while the magnetic disc 2 is rotating. The slider 3 has the side surfaces 39, 39' and the backside surface 32 placed in the recessed portion 62 with a certain play provided therebetween in such a manner that the side surfaces 39, 39' and the surface of the backside 32 are completely covered by the recessed portion 62 and only the outer surface 31 is disclosed so as to confront the magnetic disc 2. The supporting arm 7 is disposed close to the magnetic disc 2, the same as shown in FIGS. 42A and 42B. The film magnetic head 4 is disposed on the side surface 39', that is the surface adjacent to the air outlet, of the slider 3.

In the tenth embodiment, when air under pressure is supplied from the pump 41 to the air jetting holes 12a, 12c via the air duct 13 through the filter 301, the slider 3 is moved to the central positions in the recessed portion 62 in a longitudinal direction of the recessed portion 62 and in a transverse direction perpendicular thereto and is retained there. Since the levels of the air pressure at all of the jetting holes 12a, and 12c are the same, the slider 3 can be automatically returned to and retained at the central portion in the recessed portion 62 even if it has deviated from the same due to a disturbance or the like. Furthermore, the high pressure air discharged from the jetting holes 12b formed in the bottom surface 62b of the recessed portion 62 presses the slider 3 toward the surface of the magnetic disc 2. As described above, the slider 3 is supported and pressed or loaded by the high pressure air. The slider 3 is apart from the magnetic disc 2 by a small gap, at which a slider pressing load is balanced with a buoyancy of the slider due to relative movement between the magnetic disc 2 and the slider 3. Therefore, the rigidity for rolling, pitching and translation can be satisfactorily reduced. That is, as a result of the above-described structure arranged in such a manner that the slider 3 is supported and loaded by the high pressure air, the slider 3 can be supported in such a manner that the movement of the slider 3 is not restricted. Therefore, the characteristics of the flying head slider 3 to follow the waviness of the magnetic disc 2 and the deflection of the surface of the same can be improved. Furthermore, the change in the distance between the slider 3 and the disc surface due to the resonance of the head slider supporting mechanism can be effectively prevented. Additionally, since the force for pressing the flying head slider 3 toward the magnetic disc 2 can optionally be changed by adjusting the air pressure discharged from the jetting holes 12b the distance between the flying head slider 3 and the disc surface can be easily adjusted. Furthermore, since the high pressure air in the recessed portion 62 acts as a shock absorber, the vibration of the slider 3 can be prevented and the change in the distance from the disc surface can be reduced even if the slider 3 is vibrated by a disturbance.

Figure 36:
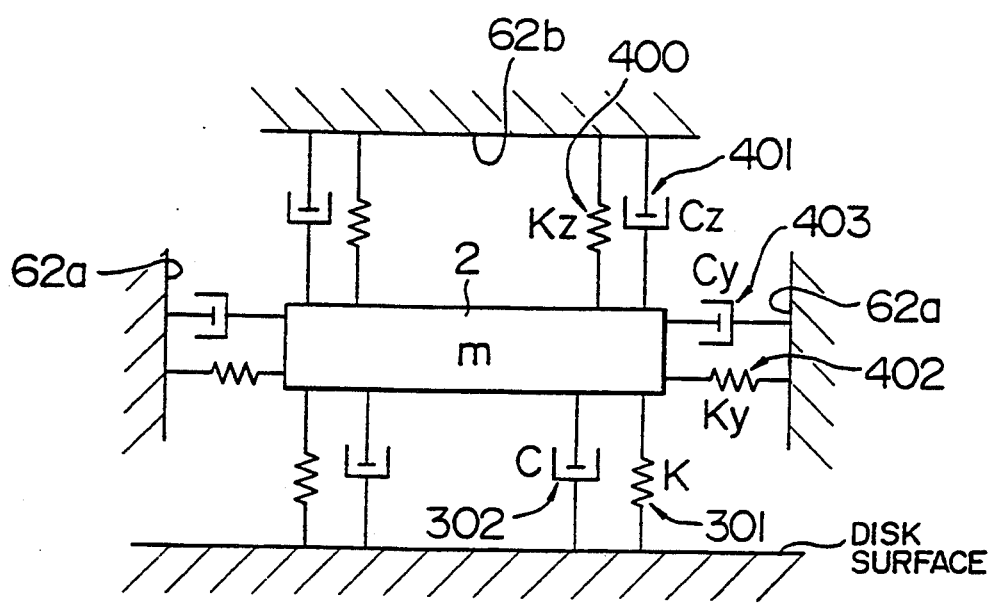
FIG. 36 illustrates a dynamic model of the tenth embodiment of the present invention.

A dynamic model of the flying head slider supporting mechanism according to this embodiment will now be described with reference to FIG. 36. The flying head slider 3 is positioned and supported by an air bearing 402 due to the above-described high pressure air. Furthermore, it is pressed toward the surface of the magnetic disc 2 by an air bearing 400 due to the above-described high pressure air. Therefore, the elastic rigidity (the rigidity against pitching, rolling and translation) of the supporting mechanism according to this embodiment can be considerably reduced with respect to the rigidity (spring constant K and damping coefficient C) of a thin air layer formed between the outer surface of the slider 3 and the surface of the magnetic disc 2. Furthermore, the above-described high pressure air in the recessed portion 62 has a shock absorbing performance due to the viscosity of air. The damping coefficient due to the spring constant $K_y$ of the air bearing 402 is expressed by $C_y$ and the damping coefficient due to the spring constant $K_z$ of the air bearing 400 is expressed Y by $C_z$. Therefore, the slider 3 can satisfactorily follow the waviness of the surface of the magnetic disc 2 due to the waviness and the surface roughness of the magnetic disc 2 or air flow generated due to the rotation of the magnetic disc 2. Consequently, a predetermined distance from the disc surface can be satisfactorily maintained.

Figure 33:
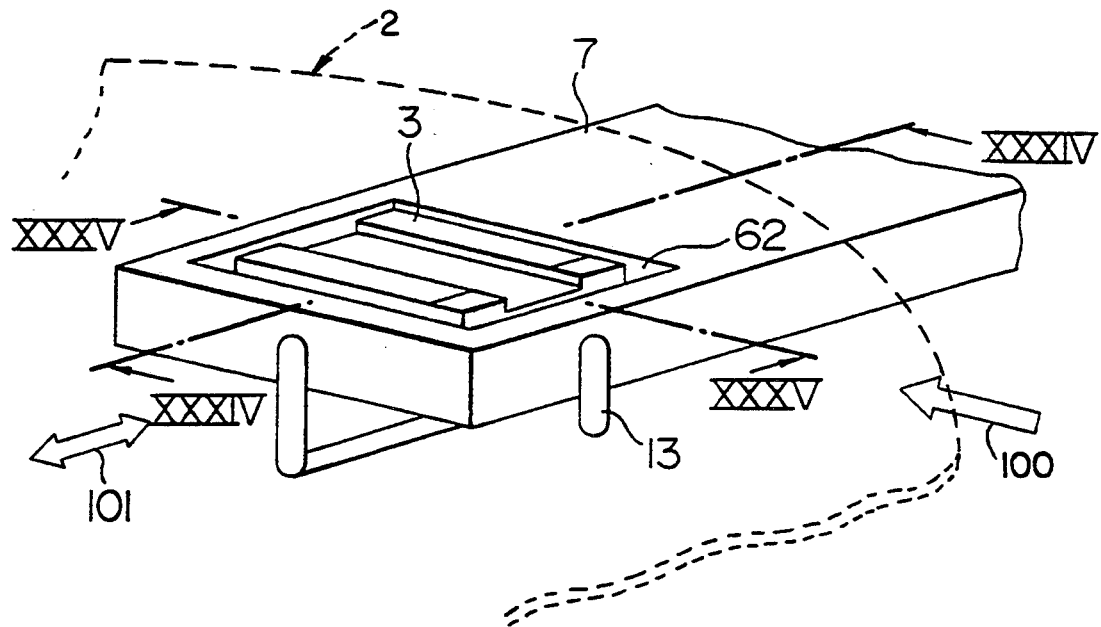
FIG. 33 is a perspective view which illustrates a tenth embodiment of the present invention.
Figure 34:
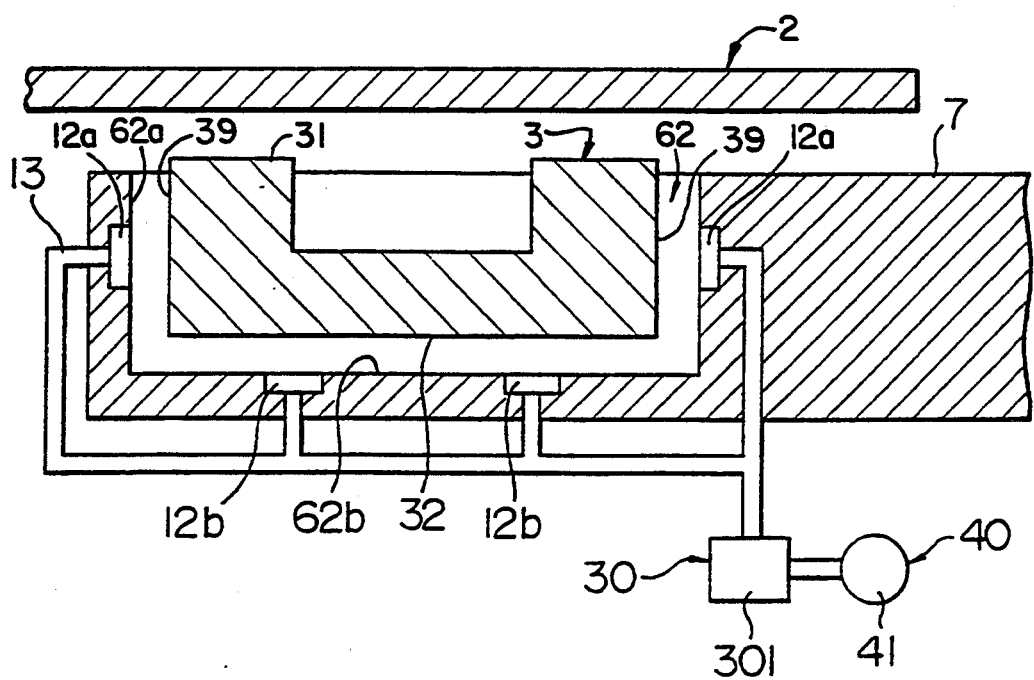
FIG. 34 is a cross sectional view taken along the line XXXIV—XXXIV of FIG. 33.
Figure 35:
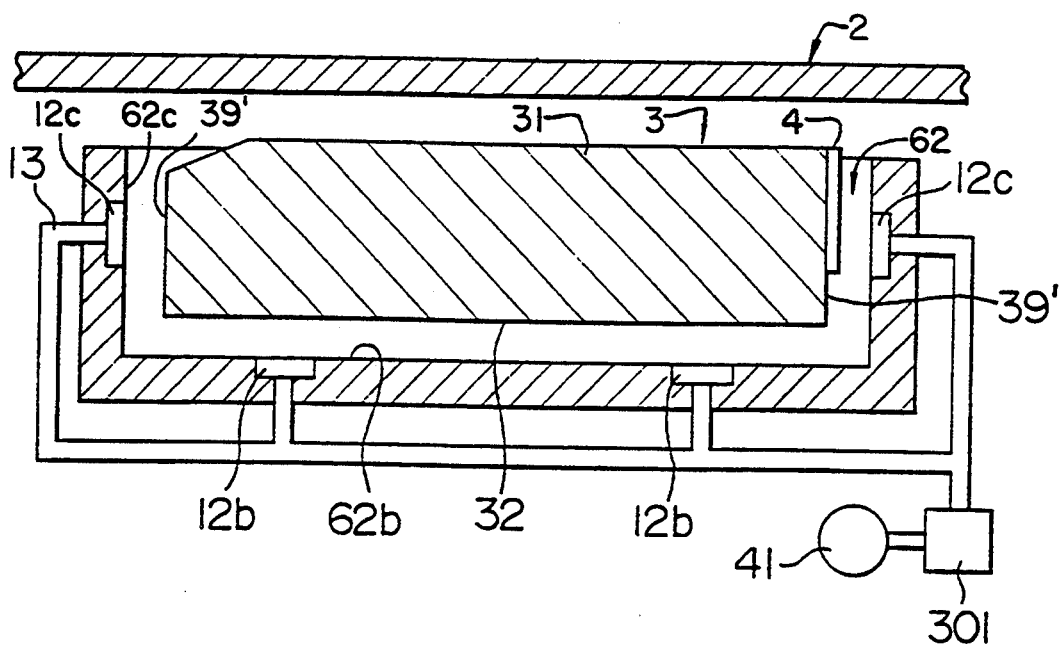
FIG. 35 is a cross sectional view taken along the line XXXV—XXXV of FIG. 33.
Figure 38:
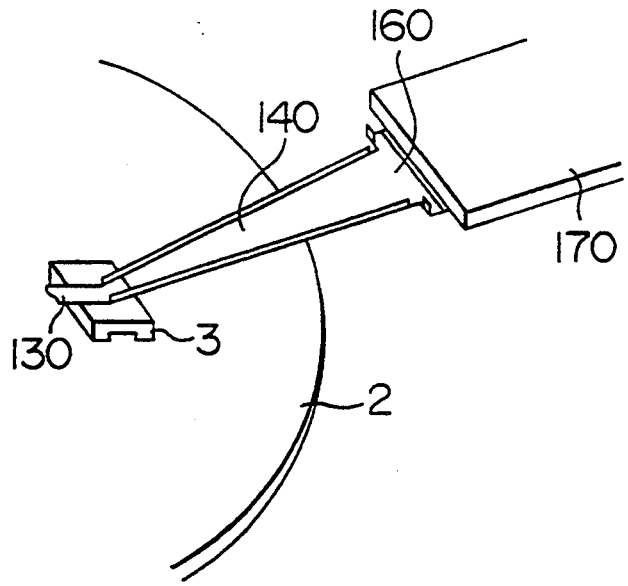
FIGS. 38 and 39 illustrate the conventional flying head slider supporting mechanism.
Figure 39:
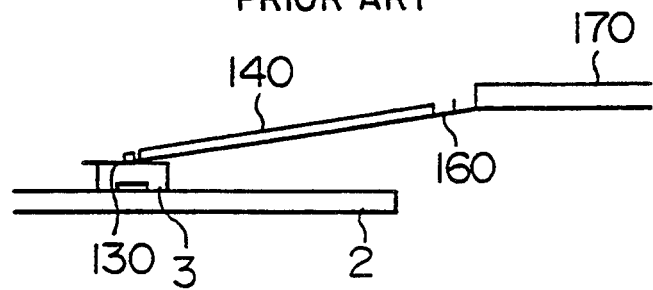
Figure 40:
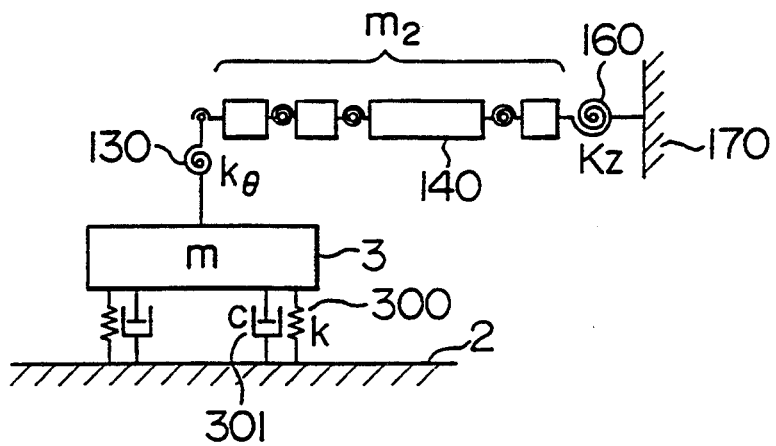
FIG. 40 illustrates the dynamic model of the conventional flying head slider supporting mechanism.

FIG. 37 is a graph which illustrates the result of a measurement of the transfer characteristics of the slider supporting mechanism shown in FIG. 33. The transfer characteristics is measured by forcibly vibrating the slider supporting arm 3 so as to detect the change in the distance between the flying head slider 3 and the disc surface and by analyzing the detected result by a fast Fourier transformer (FFT). Referring to FIG. 37, the abscissa represents vibrating frequency f, while the ordinate represents the ratio of the change $\Delta h$ of a gap between the surface of the magnetic disc 2 and the surface of the slider 3 to vibrating amplitude $\Delta z$. A solid line in the graph represents the transfer characteristics of the flying head slider supporting mechanism according to the present invention. A dash line represents the transfer characteristics of a conventional flying head slider supporting mechanism shown in FIG. 38 for making a comparison (a fixed portion 170 shown in FIG. 38 is forcibly vibrated). The conventional supporting mechanism comprises a slider 3 disposed above the magnetic disc 2, a loading arm 140 for carrying the slider 3 via a gimbal spring 130, the fixed portion 170 and a loading spring portion 160 for connecting the fixed portion 170 and the loading arm 140. The dynamic model of the conventional supporting mechanism is shown in FIG. 40. As shown in FIG. 37, since the flying head slider supporting mechanism according to the present invention has no mass in the supporting mechanism portion, the resonance point at f=2.3 KHz which has appeared considerably in the transfer characteristics of the conventional slider supporting mechanism can not be observed, with, 2.3 KHz being the characteristic frequency of the supporting system of the conventional slider supporting mechanism. As is shown in FIG. 37, the transfer characteristics of the change in the distance between the slider 3 and the disc surface is reduced by about 30 dB (1/50) at f =2.3 KHz in the supporting mechanism according to the present invention with respect to that of the conventional supporting mechanism.

Figure 41:
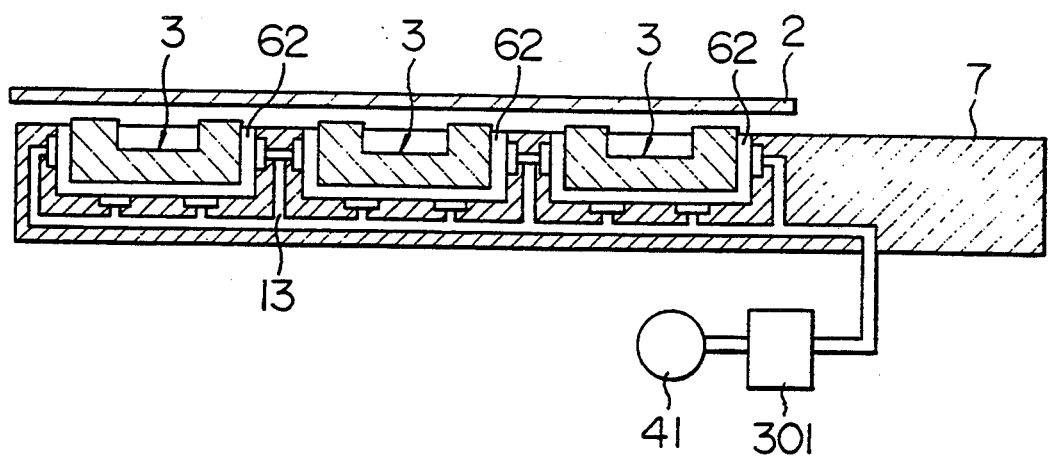
FIG. 41 is a cross sectional view which illustrates an eleventh embodiment of the present invention.

Referring to FIG. 41, an eleventh embodiment of the present invention has three recessed portions 62 arranged in the radial direction of the magnetic disc 2, which are provided in one slider supporting arm 7 so that the three flying head sliders 3 are respectively supported. As a result of the above-described structure, the mounting efficiency of the flying head slider 3 can be improved and effects similar to those according to the first embodiment can be obtained. The data access time can, of course, be shortened with respect to that realized in a structure in which only one slider is provided therein. Furthermore, the piping of the air duct can be simplified by providing the air duct 13 in the slider supporting arm 7.

FIGS. 42A and 42B illustrate a thirteenth embodiment of the present invention, with the difference between the tenth embodiment and the thirteenth embodiment residing in the fact that a pressure applying/lowering pump 42 is provided so as to serve as the pressure adjusting means 40. As a result, the auto-loading of the flying head slider 3 can be performed. That is, when pressure is applied by the pump 42, a load is generated on the slider 3 in the opposite direction to the flying force. As a result, the slider 3 is loaded to confront the surface of the magnetic disc 2 (see FIG. 42A). On the other hand, when pressure is lowered by the pump 42, a load in the same direction as that of the flying force acts on the slider 3 so that the slider 3 is separated from the surface of the magnetic disc 2. As a result, the slider 3 is unloaded (deloaded) (see FIG. 42B). Also according to this embodiment, effects similar to those obtainable according to the tenth embodiment of the present invention can be obtained.

Figure 43:
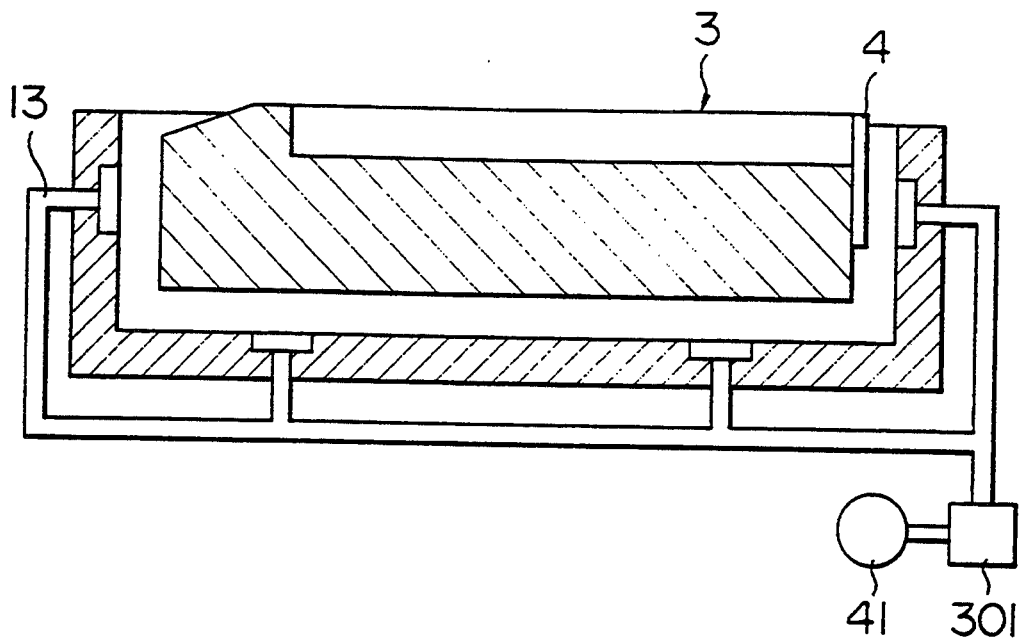
FIG. 43 is a cross sectional view which illustrates a fourteenth embodiment of the present invention.

FIG. 43 illustrates a fourteenth embodiment of the present invention. According to the tenth to the thirteenth embodiments of the present invention, the positive pressure pressure type slider is employed so as to serve as the flying head slider 3; however, a negative pressure slider is employed in the fourteenth embodiment. The negative pressure slider can use a negative pressure which has been produced as part of load of the flying head slider supporting mechanism. When the load is the same, the effective load of the flying head slider 3 is increased so that the following characteristics of the flying head slider 3 can be improved. As a result, the undesirable change in the distance from the disc surface can be reduced. Also according to this embodiment, effects similar to those obtainable according to the tenth embodiment of the present invention can be obtained.

Figure 44:
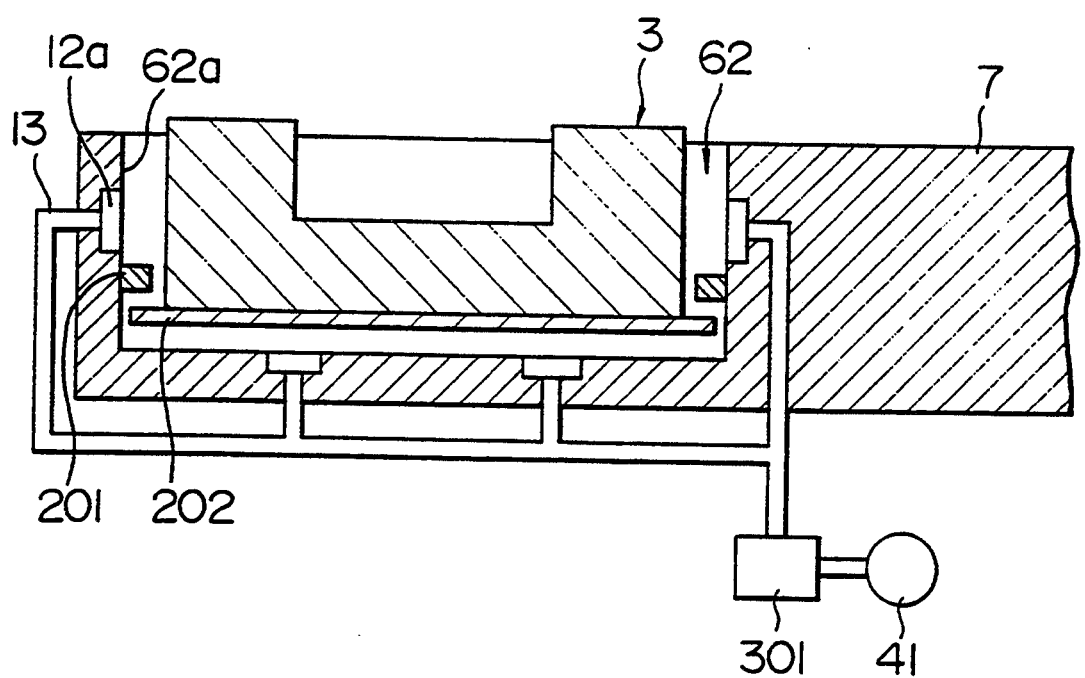
FIG. 44 is a cross sectional view which illustrates a fifteenth embodiment of the present invention.

FIG. 44 illustrates a fifteenth embodiment of the present invention in which a stopper 201 for stopping the slider 3 is provided on the side wall 62a of the recessed portion 62 formed in the slider supporting arm 7. Furthermore, a flexible projection 202 capable of being engaged to the stopper 201 projects from the backside of the slider 3. As a result, the slider 3 can easily be placed in the recessed portion 62. In addition, the slider 3 can be held by an engagement realized by the flexible projection 202 provided on the backside of the slider 3 and the stopper 201. Therefore, the slider 3 cannot drop from the recessed portion 62 when the flying head slider supporting mechanism is transported or changed in posture to face the opening of the recessed portion 62 in a downward direction. Therefore, the flying head slider supporting mechanism can be easily mounted on the magnetic disc drive apparatus, causing the manufacturing yield to be improved. Also according to this embodiment, effects similar to those obtainable according to the tenth embodiment of the present invention can be obtained.

Figure 45:
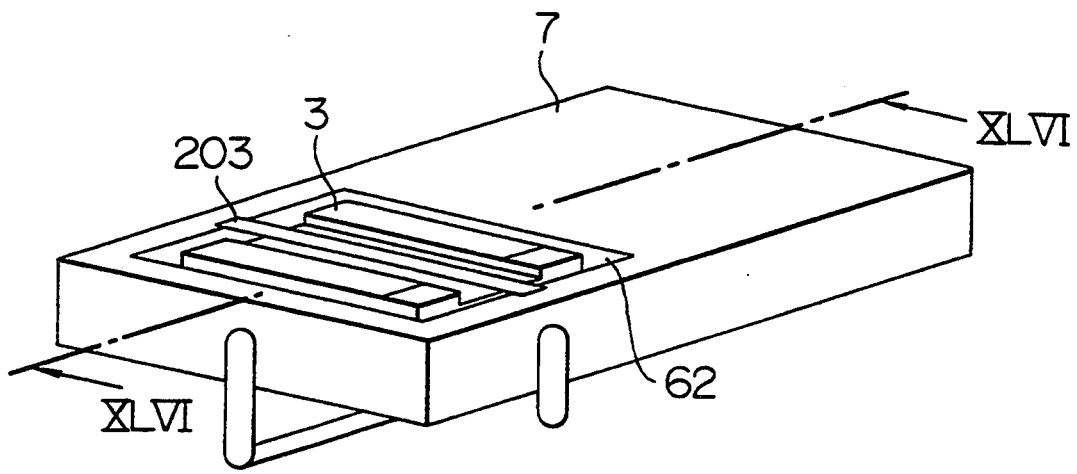
FIG. 45 is a perspective view which illustrates a sixteenth embodiment of the present invention.
Figure 46:
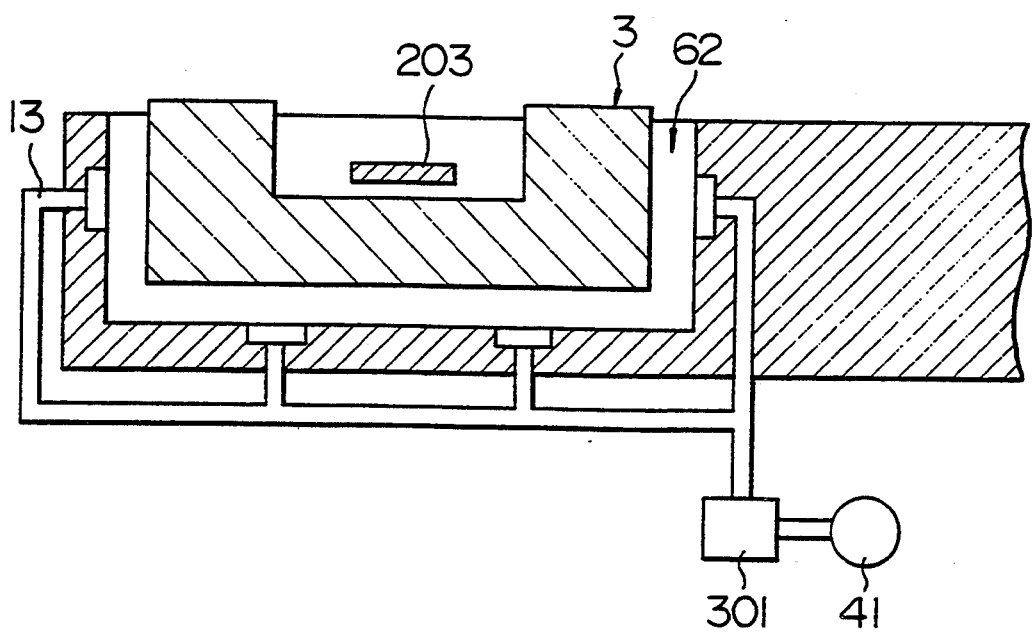
FIG. 46 is a cross sectional view taken along the line XLVI—XLVI of FIG. 45.

FIGS. 45 and 46 illustrate a sixteenth embodiment of the present invention in which a stopper band 203 for stopping the slider 3 is provided in the slider supporting arm 7. As a result, the separation of the slider 3 from the recessed portion 62 can be prevented, causing the reliability of the flying head slider supporting mechanism to be improved. Also according to this embodiment, effects similar to those obtainable according to the tenth embodiment of the present invention can be obtained.

Figure 47:
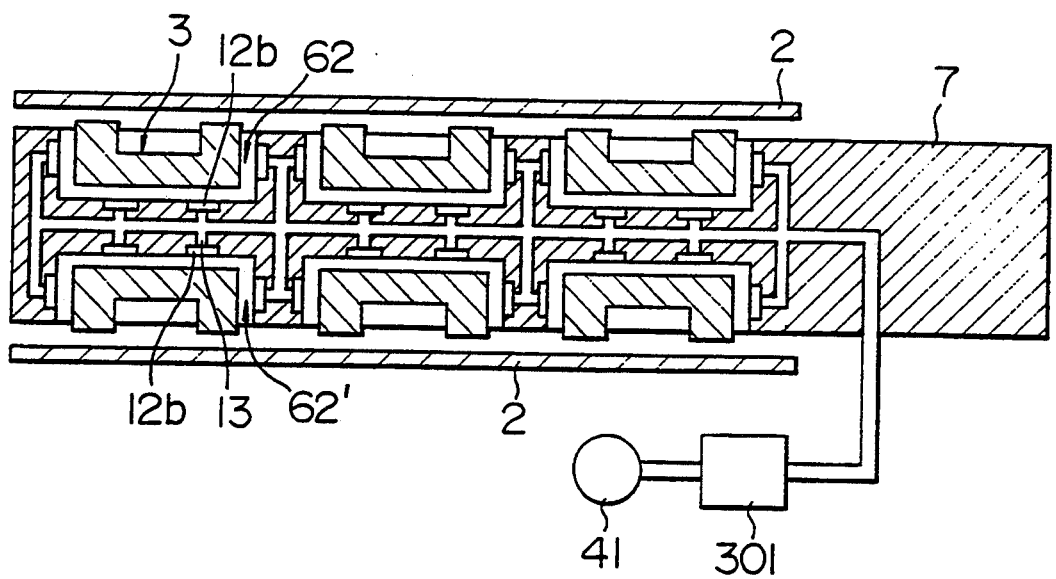
FIG. 47 is a cross sectional view which illustrates a seventeenth embodiment of the present invention.

FIG. 47 illustrates a seventeenth embodiment of the present invention in which a plurality of recessed portions 62 and 62' are formed in both sides of the slider supporting arm 7, which are arranged in the radial direction of the magnetic disc 2. Furthermore, the head sliders 3 are disposed within the respective recessed portions 62 and 62'. As a result, the mounting efficiency of the head sliders 3 can be improved and the gap between the magnetic discs 2 can be reduced with respect to that realized according to the conventional structure. Therefore, the size of the magnetic disc drive apparatus can be easily reduced. Furthermore, the air pressure at the recessed portions 62 and 62' can be made the same by connecting the jetting holes to one another by the air duct 13. Therefore, even if a positional error takes place in the axial direction when the flying head slider supporting mechanism is inserted into the magnetic discs 2 so as to position it, the actual distance between the slider 3 and the disc surface is not changed since the pressure level of air from the jetting holes is equalized and the loads to be applied to the sliders 3 thereby become the same. Furthermore, effects similar to those obtainable according to the tenth embodiment can be obtained.

Figure 48:
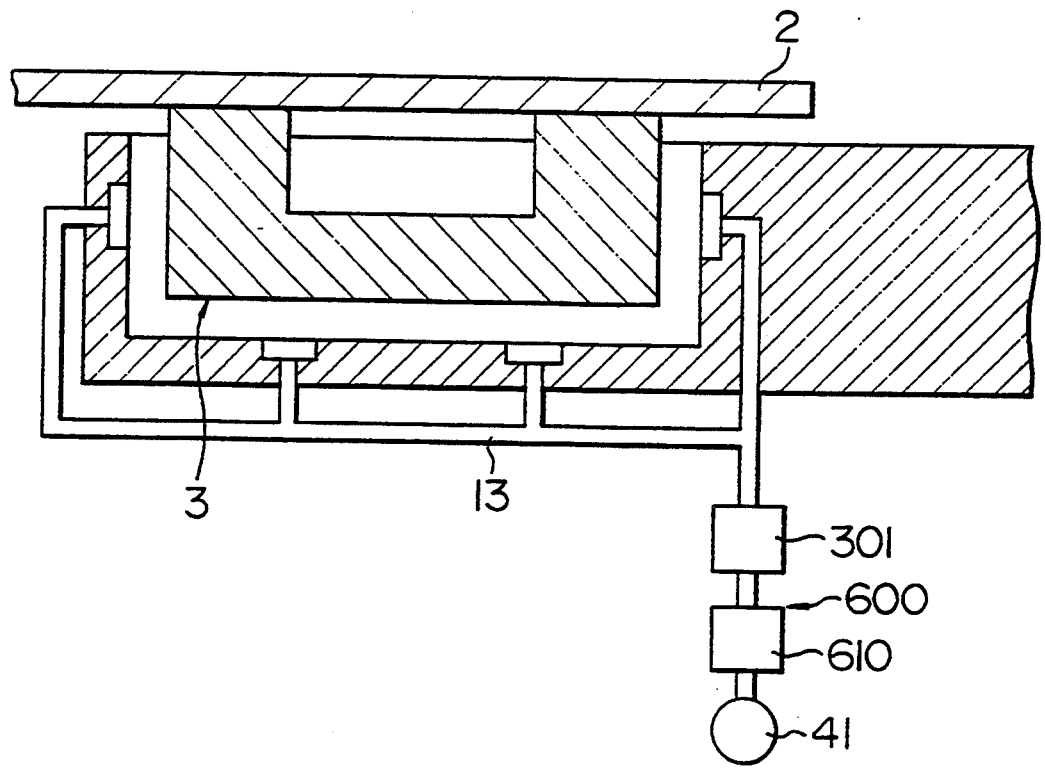
FIG. 48 is a cross sectional view which illustrates an eighteenth embodiment of the present invention.

According to the eighteenth embodiment of FIG. 48, a heater 610 is provided as air heating means 600 between the pump 41 and the filter 301. As a result, dry hot air can be supplied to a contact surface between the slider 3 and the magnetic disc 2. Therefore, water gathered by a capillary phenomenon in a small space between the slider 3 and the stopped magnetic disc 2 can be evaporated. As a result, adhesion can be prevented. Furthermore, effects similar to those obtainable according to the tenth embodiment of the present invention can be obtained.

Figure 49:
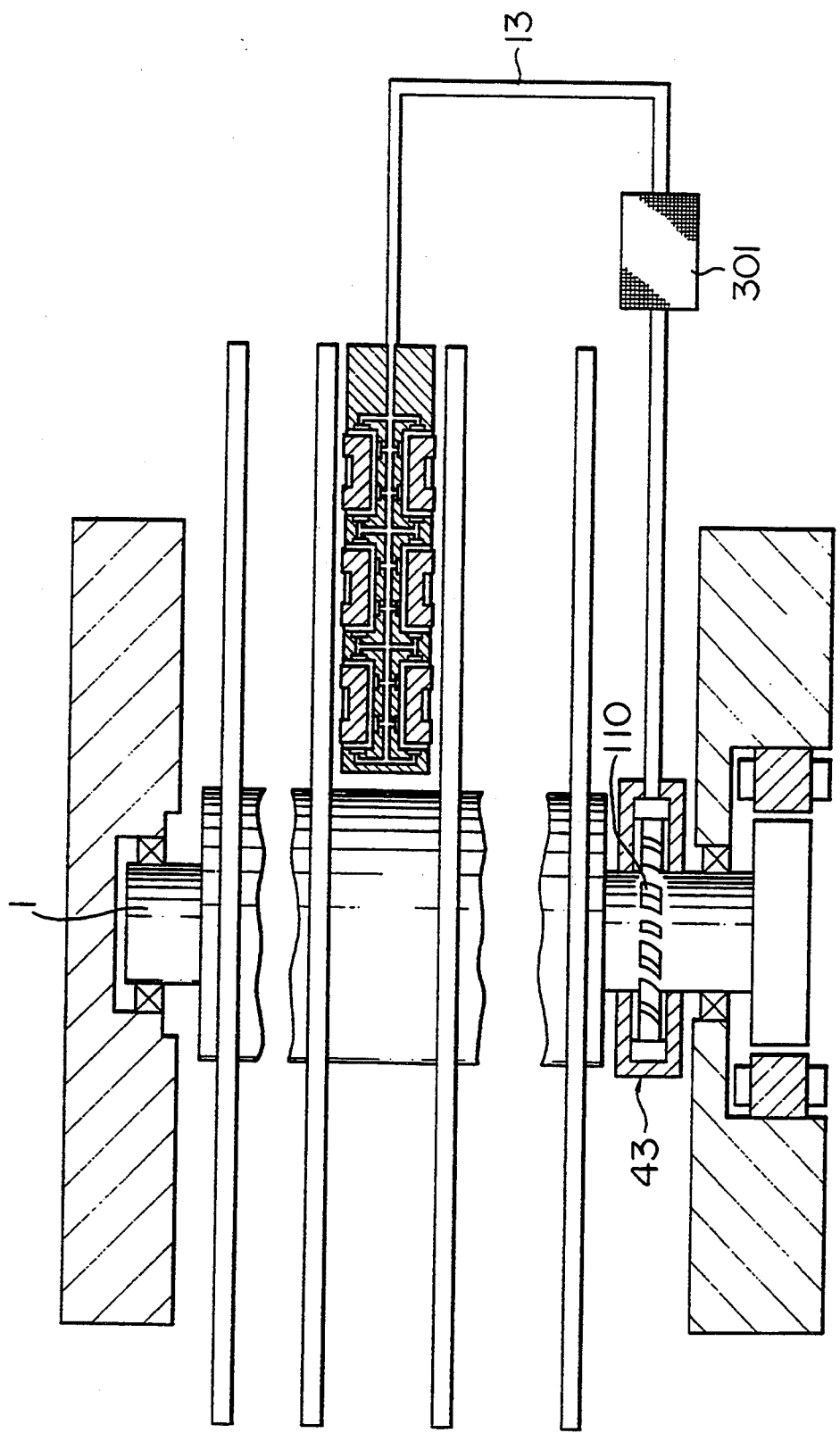
FIG. 49 is a cross sectional view which illustrates a nineteenth embodiment of the present invention.

Referring to FIG. 49, a compressor 43 is employed as the pressure adjusting means. The compressor 43 includes fins 110 provided on the rotational shaft of the magnetic disc drive apparatus and a housing 120 surrounding the fins 110. Thus, air under pressure can be supplied to the slider supporting arm 7 via the air dust 13 and the filter 301 by the compressor 43. As a result, air under pressure can be created without an additional pump. Therefore, an advantage can be obtained in that the size of the magnetic disc drive apparatus can be reduced. Furthermore, effects similar to those obtainable according to the tenth embodiment of the present invention can be obtained.

Figure 50:
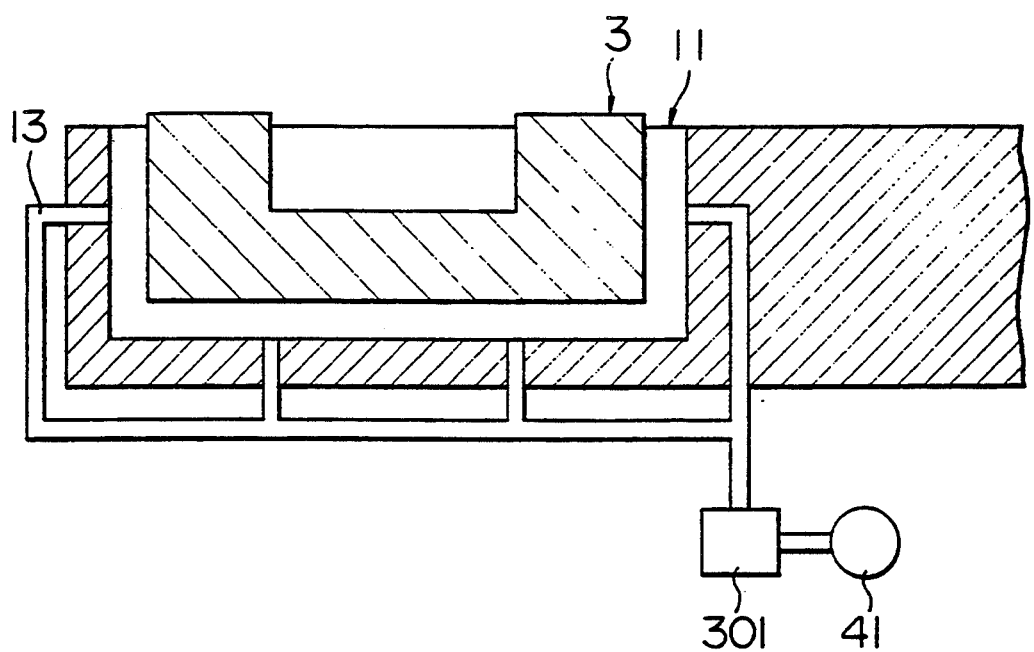
FIG. 50 is a cross sectional view which illustrates a twentieth embodiment of the present invention.

In the twentieth embodiment of FIG. 50, the wall of the recessed portion 62 is not provided with the enlarged jetting holes but the air ducts 13 are, as it is, opened in the recessed portion 62. As a result, the phase delay of the air bearing taken place due to the enlarged jetting hole can be prevented, causing the vibration (self-excited vibration) of the air bearing to be prevented. Therefore, the slider 3 can be stably supported. Furthermore, since no enlarged jetting hole is provided, the recessed portion 62 can be easily manufactured, causing the manufacturing yield of the flying head slider supporting mechanism to be improved. Furthermore, effects similar to those obtainable according to the tenth embodiment can be obtained.

Figure 51:
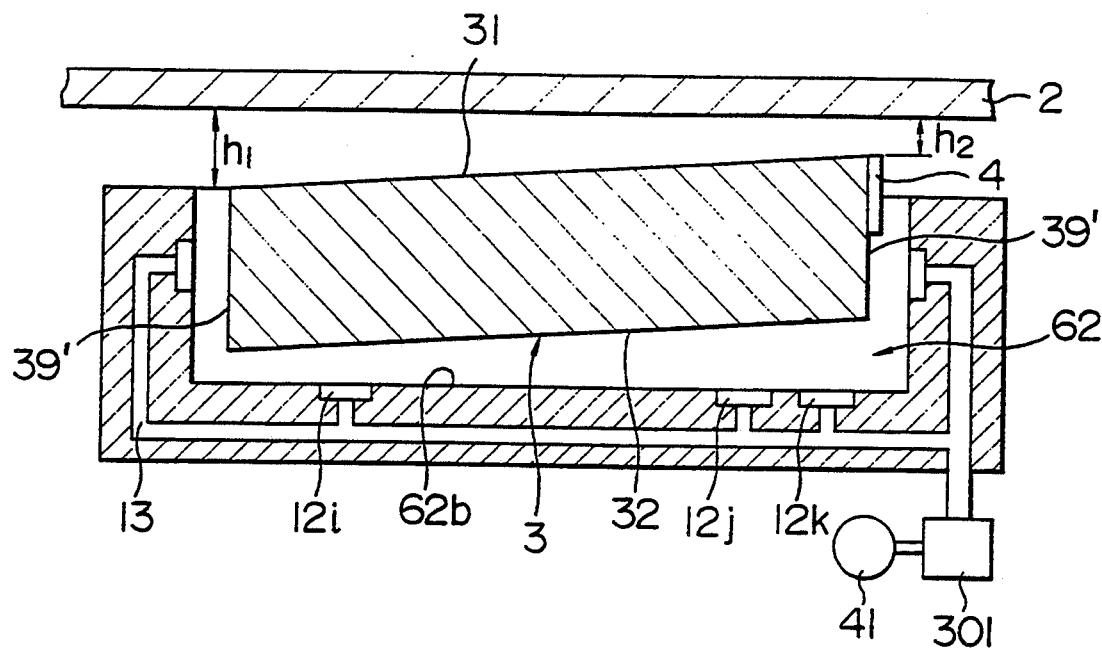
FIG. 51 is a cross sectional view which illustrates a twenty-first embodiment of the present invention.

FIG. 51 illustrates a twenty-first embodiment of the present invention wherein the air duct 13 is provided in the slider supporting arm 7 and two jetting holes 12j and 12k are formed in the bottom surface 62b of the recessed portion 62 adjacent to the air introduction side 39' of the slider 3. On the other hand, one jetting hole 12i is formed in the bottom surface 62b of the recessed portion 62 adjacent to the air discharge side 39' of the slider 3. Since the air duct 13 is provided in the slider supporting arm 7, the size of the flying head slider supporting mechanism can be reduced. Furthermore, since the one jetting hole 12i is provided on the introduction side 39' of the slider 3 and the two jetting hole 12j and 12k are provided on the discharge side 39' of the slider 3, the loads applied by the air bearings to the slider backside 32 can be made nonequal. That is, since the slider backside 32 adjacent to the air discharge side 39' has two jetting holes 12j and 12k, spring constant $K_{ZR}$ of the air bearing formed by the above-described two jetting holes 12j and 12k is higher than spring constant $K_{ZF}$ of the air bearing formed by the one jetting hole 12i adjacent to the air introduction side 39'. Therefore, the slider 3 flies in such a manner that the distance $h_1$ of the air introduction side 39' from the surface of the magnetic disc 2 is less than the distance $h_2$ of the air discharge side 39' from the surface of the magnetic disc 2.

A magnetic head 50 is fastened to the air discharge side 39' of the slider 3 and the read/write characteristics of the magnetic head 50 become advantageous when the distance from the surface of the magnetic disc 2 becomes short. Therefore, an advantage can be obtained from the twenty-first embodiment of the present invention in that the read/write characteristics can be improved by controlling the attitude of the slider 3. According to the twenty-first embodiment, the two jetting holes are formed on the air discharge side. Assuming that the diameters (areas) of the jetting holes are the same, the flying attitude of the slider 3 can be optionally changed by increasing/decreasing the number of the jetting holes. On the contrary, $h_1$ can be reduced by providing a larger number of the jetting holes in the introduction side 39' than in the discharge side 39'. Since the attitude ($h_1/h_2$) of the slider 3 can be optionally changed, the taper portion becomes unnecessary for the slider surface 21; therefore, the slider 3 can be easily machined. Also according to embodiment of FIG. 51, effects similar to those obtainable according to the tenth embodiment of the present invention can be obtained.

Figure 52:
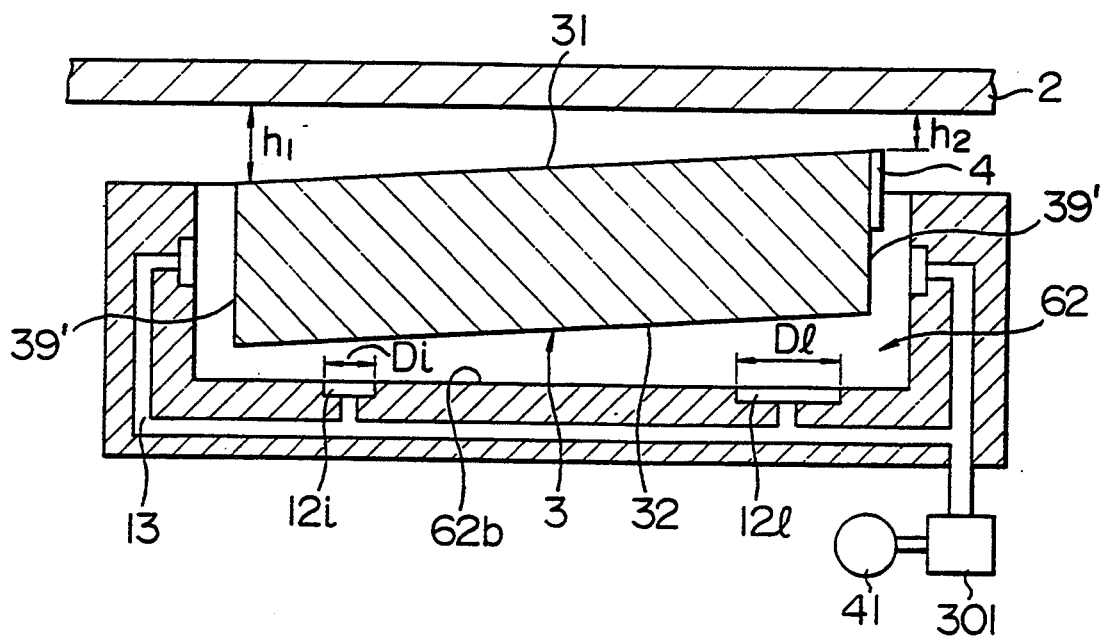
FIG. 52 is a cross sectional view which illustrates a twenty-second embodiment of the present invention.

FIG. 52 illustrates a twenty-second embodiment of the present invention arranged in such a manner that diameter (area) D1 of a jetting hole 121 formed in the bottom surface 62b of the recessed portion 62 adjacent to the air discharge side 39' is larger than a diameter (area) D1 of the jetting hole 12i formed in the bottom surface 62b of the recessed portion 62 adjacent to the air introduction side 39'. As a result, the load applied to the backside 32 of the slider 3 at the discharge side 39' becomes larger than that at the introduction side 39'. Therefore, the distance $h_2$ between the magnetic head 4 and the surface of the magnetic disc 2 becomes less than distance $h_1$ between the introduction side 39' and the surface of the magnetic disc 2. Therefore, excellent read/write characteristics can be obtained similarly to the twenty-first embodiment. According to the embodiment of FIG. 52, effects similar to those obtainable according to the twenty-first embodiment of the present invention can be obtained by virtue of the elimination of a necessity of increasing the number of the air holes, therefore. A satisfactory manufacturing yield can be obtained. Also according to the embodiment of FIG. 52, effects similar to those obtainable according to the tenth embodiment can be obtained. According to the embodiment of FIG. 52, the load to be applied to the slider 3 can be controlled by changing the areas of the jetting holes even if the level of air pressure supplied from the pump 41 is constant. However, it is apparent that a similar effect can be obtained by changing the pressure levels of the air supplied to the introduction side and the discharge side even if the areas of the jetting holes are the same. According to this embodiment, a slider having no taper on the introduction side thereof is employed.

Figure 53:
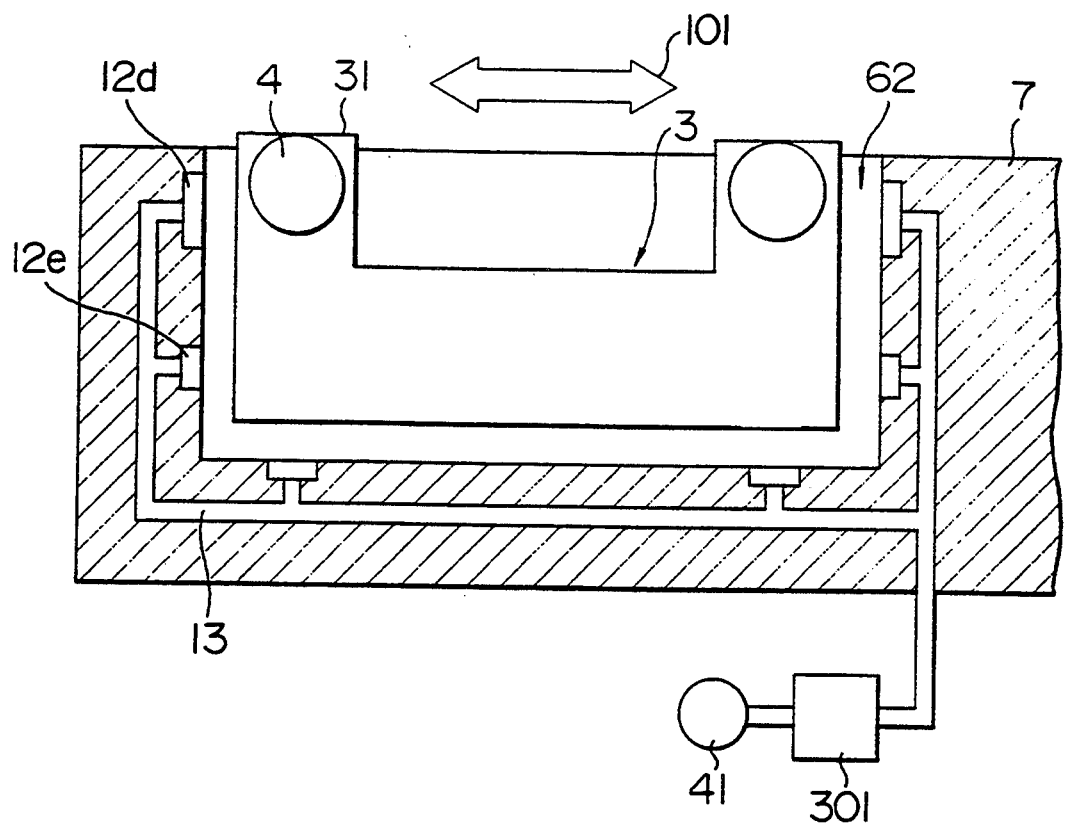
FIG. 53 is a cross sectional view which illustrates a twenty-third embodiment of the present invention.

FIG. 53 illustrates a twenty-third embodiment of the resent invention arranged in such a manner that two jetting holes 12d and 12e are formed on each of the side surface of the recessed portion 62. The diameter (area) of the jetting hole 12d disposed adjacent to the magnetic head 4 of the slider 3 is larger than that of the other jetting hole 12e. Therefore, spring constant $k_{ya}$ of the jetting hole 12d corresponding to the magnetic head 4 is larger than spring constant $k_{yb}$ of the other jetting hole 12e. As a result, when the slider 3 is moved in a seeking direction 101 for retrieving data, the vibration of the magnetic head 4 can be reduced. Therefore, the slider 3 can be quickly moved to a predetermined radial position (data position), thereby providing quick data access. Furthermore, effects similar to those obtainable according to the tenth embodiment can be obtained.

Figure 54:
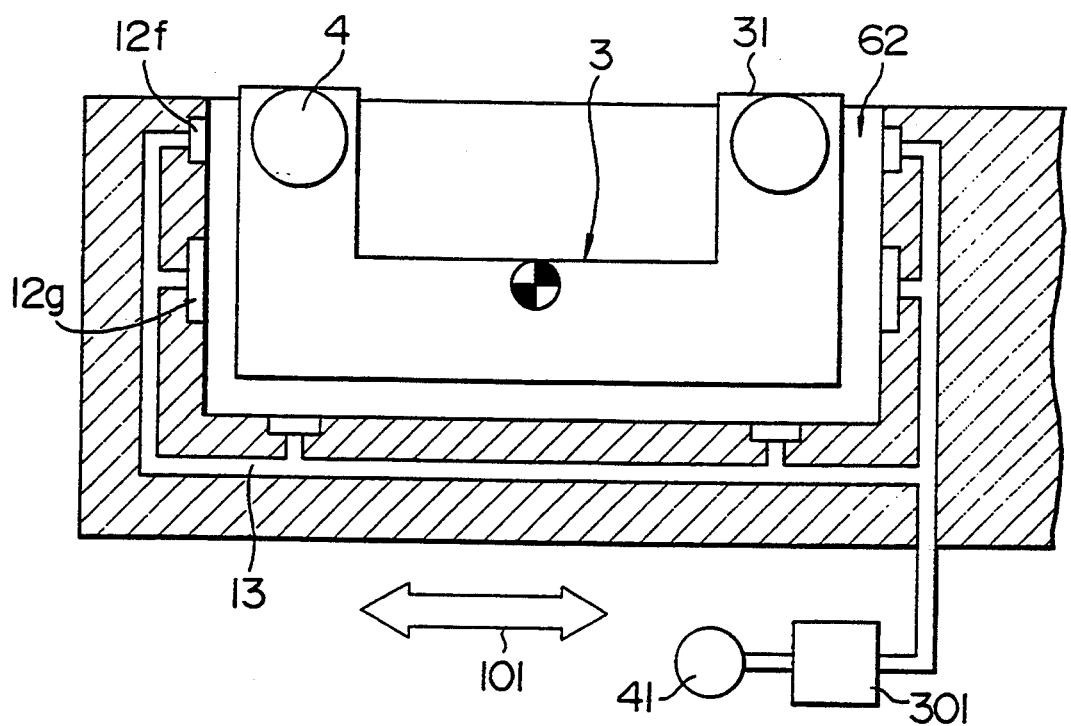
FIG. 54 is a cross sectional view which illustrates a twenty-fourth embodiment of the present invention.

FIG. 54 illustrates a twenty-third embodiment of the present invention in which two jetting holes 12f and 12g are formed on each of the side walls of the recessed portion 62. One 12g of the two jetting holes is disposed on a plane extending through the gravity center G of the slider 3 and parallel to the outer surface 31 of the slider 3. The area of the jetting hole 12g formed in the plane extending the gravity center G of the slider 3 is larger than that of another jetting hole 12f. Therefore, spring constant $k_{yb}$ of air from the jetting hole 12g is larger than that $k_{ya}$ of air from the jetting hole 12f. Therefore, when the slider 3 has sought in the seeking direction 101, the seeking acceleration $F_s$ acts on the gravity center G mainly via the air bearing $K_{yb}$. The inertial force $F_1$ at the gravity center G acts on the same plane on which the accelerating force $F_s$ acts but in the opposite direction. Therefore, the slider 3 cannot be swung relative to the center of gravity G by the accelerating force at the time of the seeking operation. Consequently, the distance between the magnetic head 4 and the magnetic disc 2 can be maintained at a constant value. As a result, read/write errors due to the change of the above-described distance and the damage of the magnetic disc 2 due to the contact between the magnetic head 4 and the magnetic disc 2 can be prevented. Also according to the embodiment of FIG. 54, effects similar to those obtainable according to the tenth embodiment can be obtained. Furthermore, it is apparent that the similar effects can be obtained even if the jetting hole 12f is omitted.

Figure 55:
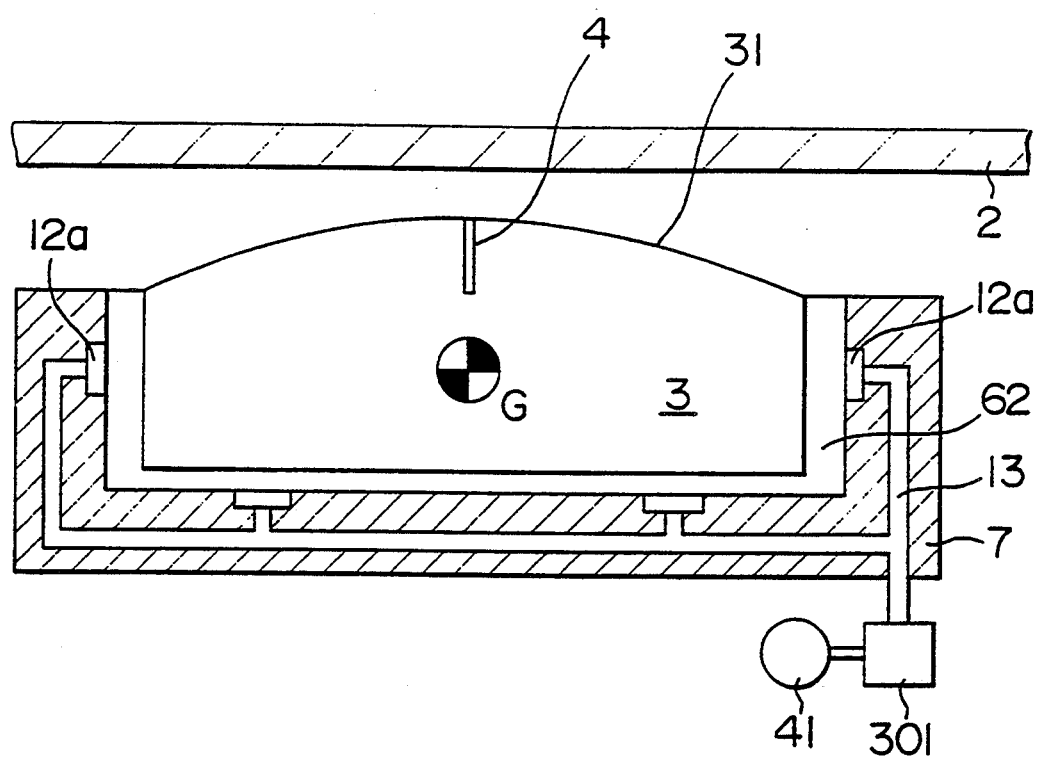
FIG. 55 is a cross sectional view which illustrates a twenty-fifth embodiment invention.

FIG. 55 illustrates a twenty-fifth embodiment of the present invention in which the outer surface 31 of the slider 3 is in the form of a crown. Furthermore, the magnetic head 4 is disposed at the central portion of the outer surface 31 which passes through the gravity center G of the slider 3. The jetting hole 12a formed in the wall of the recessed portion 62 of the slider supporting arm 7 is disposed in the plane including the gravity center G of the slider 3 and extending parallel to the surface of the magnetic disc 2. Since the magnetic head 4 is disposed at the central portion in which the gravity center G of the slider 3 exists and the jetting hole 12a for forming the air bearing is disposed in the plane including the gravity center G, the slider 3 can swing about the gravity center G. Therefore, the vibration of the magnetic head 4 can be reduced and the read/write errors can thereby be prevented. Furthermore, effects similar to those obtainable according to the tenth embodiment can be obtained.

Figure 56:
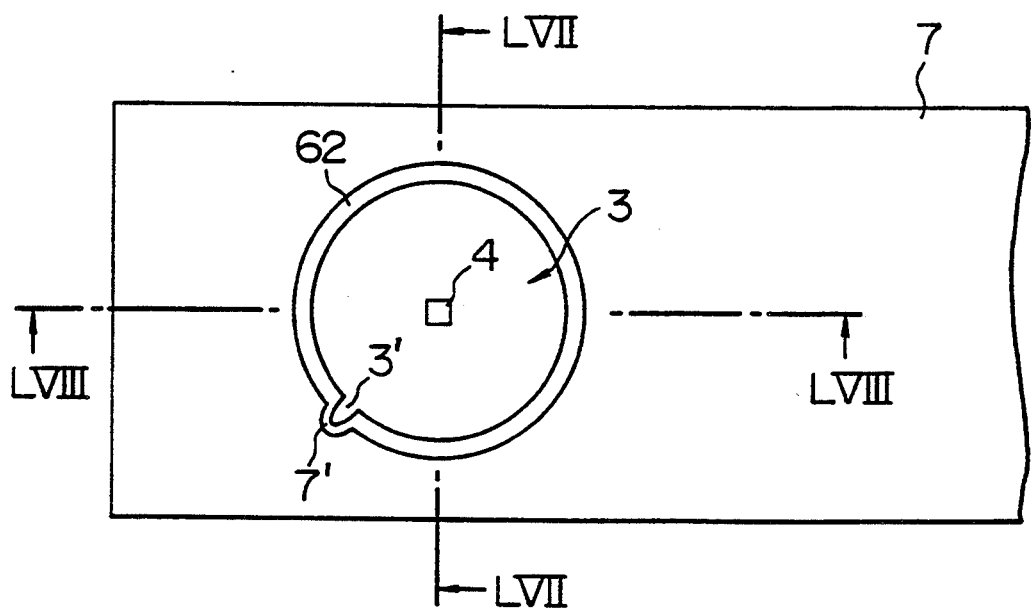
FIG. 56 is a cross sectional view which illustrates a twenty-sixth embodiment of the present invention.
Figure 57:
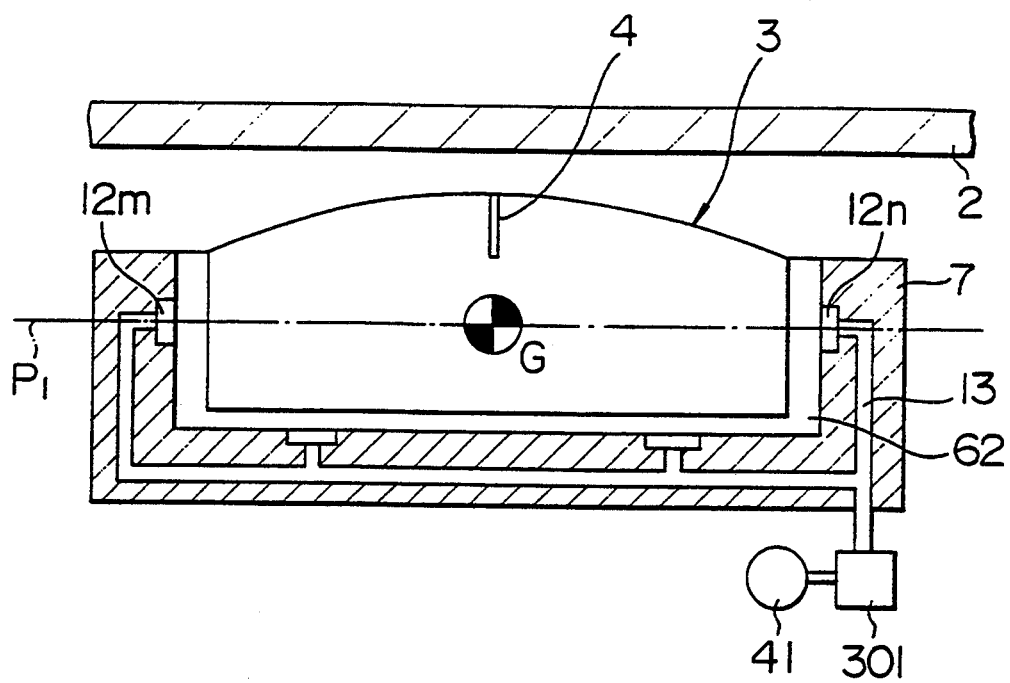
FIG. 57 is a cross sectional view taken along the line LVII—LVII of FIG. 56.
Figure 58:
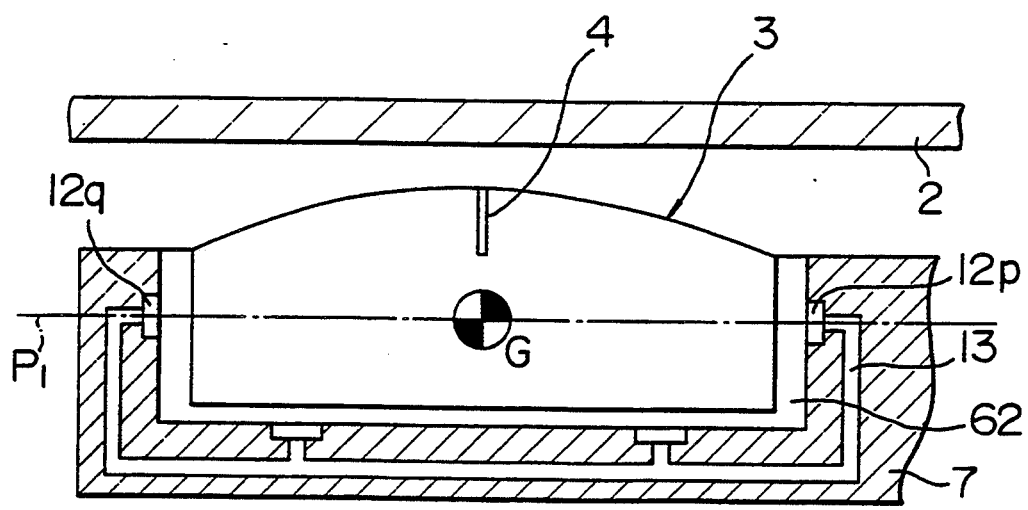
FIG. 58 is a cross sectional view taken along the line LVIII—LVIII of FIG. 56.

FIGS. 56 to 58 illustrate a twenty-sixth embodiment of the present invention in which the slider 3 is arranged to be cylindrical having a spherical surface and the magnetic head 4 is disposed at the top portion in the central portion of the spherical surface of the slider 3. Therefore, the recessed portion 62 of the slider supporting arm 7 may be cylindrically shaped, thereby improving machining operation. Furthermore, since the magnetic head 4 is disposed at the top portion in the central portion of the spherical surface of the slider 3, the necessary distance for the slider 3 to move can be minimized and the displacement of the magnetic head 4 due to the vibration of the slider 3 can be reduced satisfactorily. Referring to FIGS. 56–58, reference numerals 3' and 7' represent a projection and a cut for stopping the rotation of the slider 3. Furthermore, since four jetting holes 12m, 12p and 12q are, as shown in FIGS. 57 and 58, formed in the plane $P_1$ including the center of gravity G of the slider 3 and extending parallel to the magnetic disc 2', the gravity center G can be always supported by the air bearing even if the slider 3 has been moved in the radial or the circumferential direction of the magnetic disc 2. Therefore, the vibration of the slider 3 about the center of gravity G of the slider 3 can be effectively prevented. Furthermore, since the outer surface of the slider 3 is spherical, a constant distance from the disc surface can be maintained even if a yawing angle (an angle made with the tangent line of the magnetic disc 2) is generated. That is, even if the angle of the air flow introduced to the outer surface of the slider 3 is changed, a constant flying distance can be maintained. Also according to the embodiment of FIGS. 56 and 58, effects similar to those obtainable according to the tenth embodiment of the present invention can be obtained.

FIG. 59 illustrates a twenty-seventh embodiment of the present invention in which suction holes 80b and 80a are further provided on the bottom surface 62b and the wall 62a of the recessed portion 62 in addition to the jetting holes 12b and 12a. The suction holes 80b and 80a are connected to a reduction pump 90 serving as pressure-reducing means through the suction pipe 81 via a filter 82. Therefore, since the slider 3 can be retained in the recessed portion 62 by the attractive force of the suction hole 80b, it cannot be separated from the recessed portion 62. Furthermore, an advantage can be obtained in that the distance between the backside 32 and the bottom surface 62b of the recessed portion 62 can be freely controlled by controlling the attractive force of the suction hole 80b by the reduction pump 90. Also according to the embodiment of FIG. 59, since the jetting hole 12a formed in the wall 62a of the recessed portion 62 is disposed on a plane including the gravity center G of the slider 3 and extending parallel to the surface of the magnetic disc 2, the vibration around the center of gravity G of the slider 3 can be prevented in the seeking process. Since the suction hole 80a suctions air jetted from the jetting hole 12a, air jetted from the jetting hole 12a is not supplied to the outer surface of the slider 3. Therefore, the flying characteristics of the slider 3 is not influenced by the above-described air. Even if dust is mixed in the air jetted from the jetting hole 12a due to a disturbance, the flying characteristics of the slider 3 are not influenced by the dust adhering to the slider 3. According to the embodiment of FIG. 59, since an air bearing generating resilience force acting on the slider 3 and an air bearing generating suction force acting thereon are formed, the load to be applied to the slider 3, the distance from the surface of the magnetic disc 2 and the flying attitude can be easily controlled by properly adjusting the jetting air and the suction air. Furthermore, air jetted out from the jetting hole 12b formed in the bottom surface of the recessed portion 62 is suctioned into the suction hole 80b formed in the bottom surface, while air jetted out from the jetting hole 12a formed in the wall is suctioned into the suction hole 80a formed in the wall. Therefore, the air bearing on the bottom surface and that on the wall can be made to act independently and the interference with each other can be prevented. It is apparent that effects similar to those obtainable according to the tenth embodiment of the present invention can be obtained according to this embodiment.

FIG. 60 illustrates a twenty-eigth embodiment of the present invention in which a jetting hole 12r is formed in the wall 62a of the recessed portion 62 at a position adjacent to the magnetic head 4, while another jetting hole 12s is formed in the wall 62a of the recessed portion 62 at a position adjacent to the side of the slider 3 onto which air is supplied. Diameter $D_r$ of the jetting hole 12r is larger than diameter $D_s$ of the jetting hole 12s. The spring constant of the air bearing, that is the spring effect (rigidity) of the air bearing becomes stronger in proportion to the area of the jetting hole provided that the air supply pressure is the same. Therefore, according to this embodiment, since the air bearing adjacent to the magnetic head 4 is stronger than the air bearing on the side of the slider 3 onto which air is introduced, the vibration of the magnetic head 4 can be reduced even if an acceleration in the seeking direction is applied to the slider. As a result, read/write errors can be prevented. Furthermore, effects similar to those obtainable according to the tenth embodiment can be obtained according to this embodiment.

Figure 61:
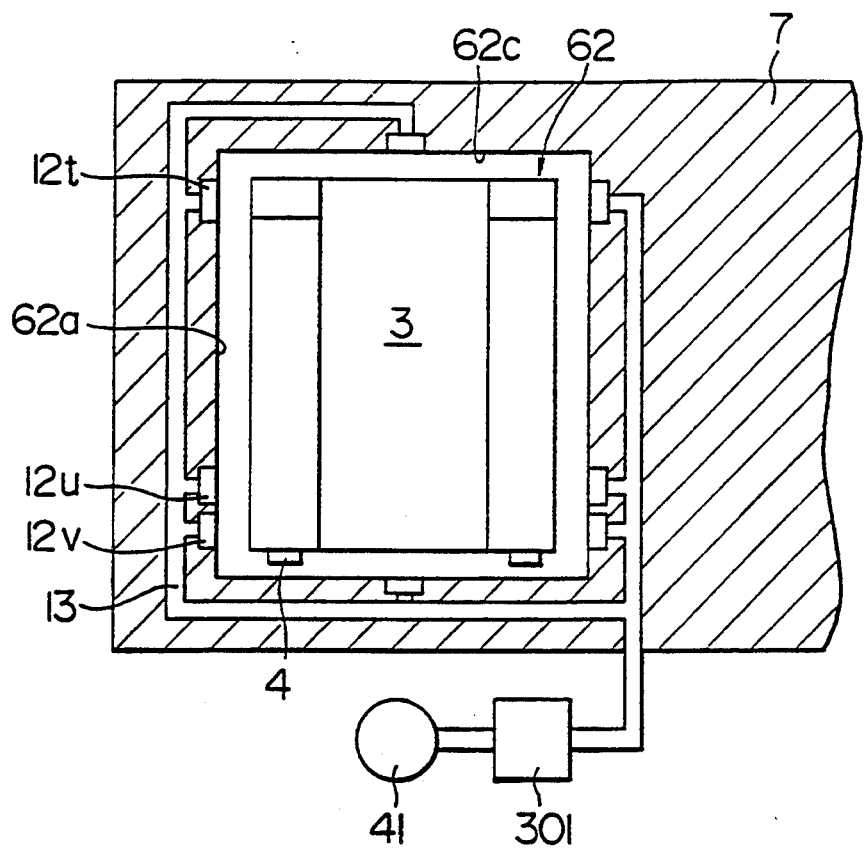
FIG. 61 is a cross sectional view which illustrates a twenty-ninth embodiment of the present invention.

FIG. 61 illustrates a twenty-ninth embodiment of the present invention in which two jetting holes 12u and 12v are provided in the wall 62a of the recessed portion 62 adjacent to the magnetic head 4, while a jetting hole 12t is formed adjacent to the side of the slider 3 onto which air is introduced. As a result, the air bearing in a portion in which the magnetic head 4 is present becomes stronger for the same reason as explained above in connection with the twenty-eigth embodiment of the present invention. Therefore, an advantage can be obtained in that read/write errors can be prevented. Also according to this embodiment, effects similar to those obtainable according to the tenth embodiment can be obtained.

Figure 62:
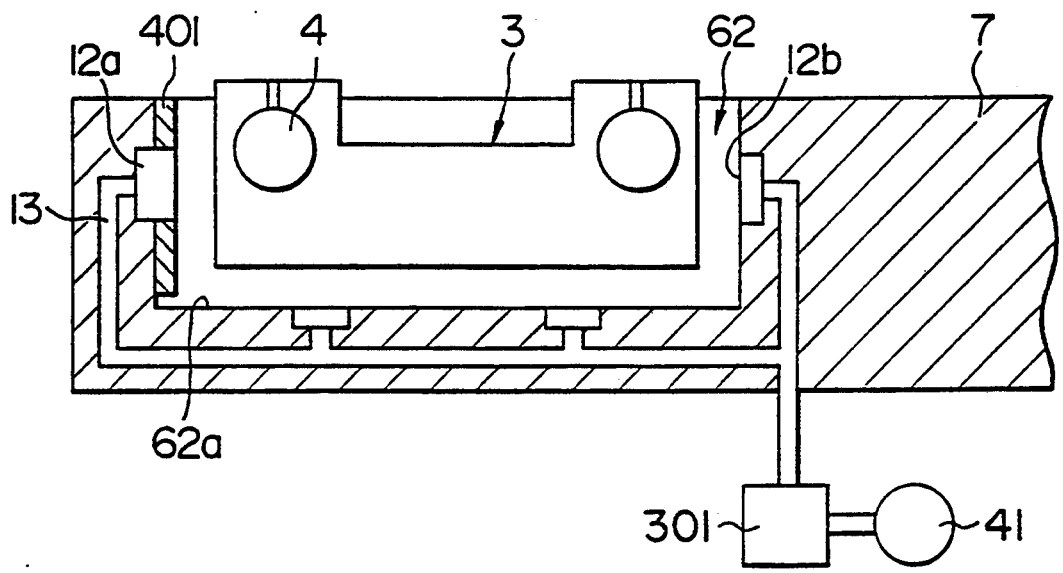
FIG. 62 is a cross sectional view which illustrates a thirtieth embodiment of the present invention.
Figure 62A:
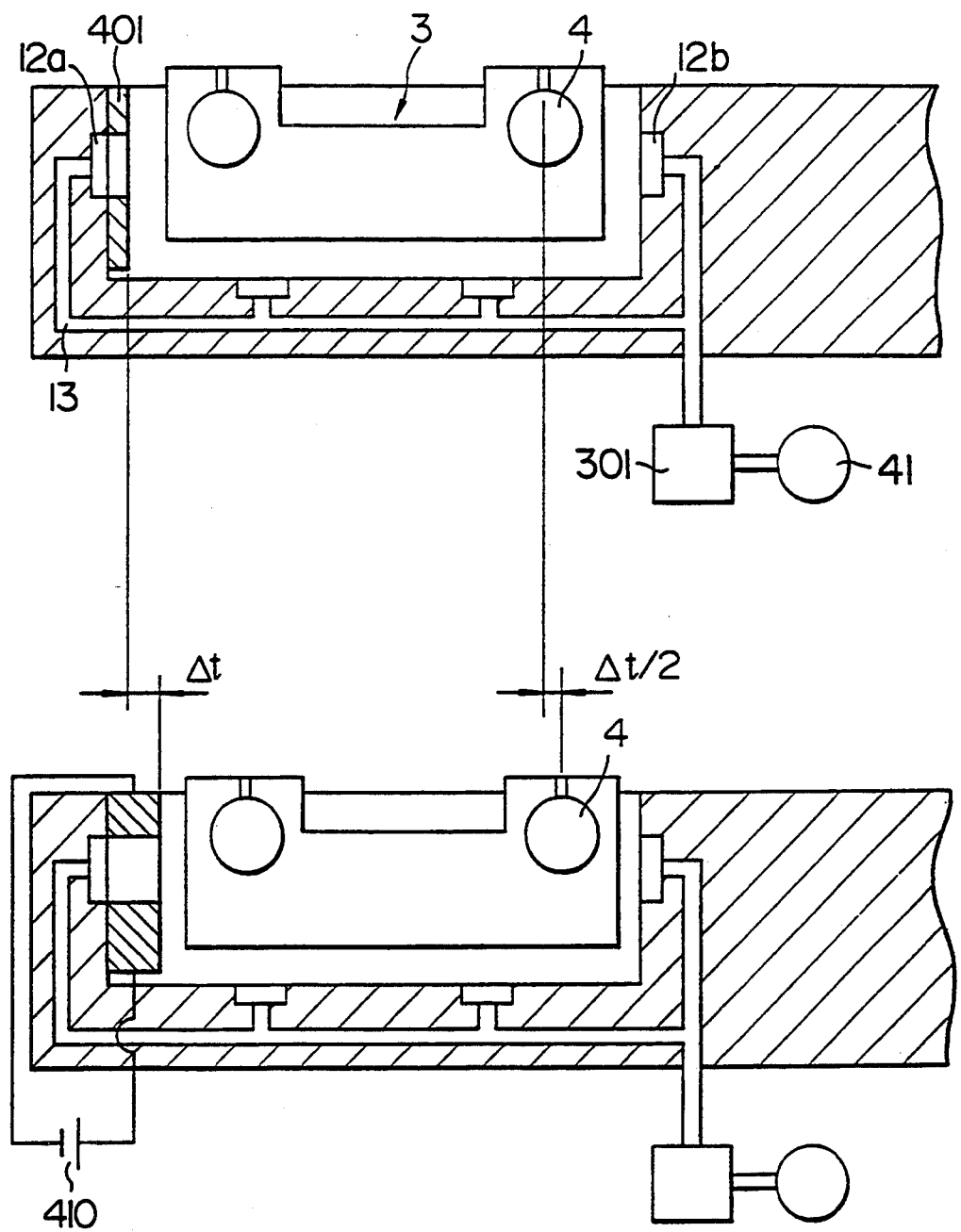
FIG. 62A illustrates the change in the recessed portion shown in FIG. 62.

FIG. 62 illustrates a thirtieth embodiment of the present invention in which a shape variable member, for example, an electrostriction element (piezoelectric element) 401 is provided on the wall 62 of the recessed portion 62 in the slider supporting arm 7, the electrostriction element 401 having a jetting hole 12a formed therein. The operation of the embodiment of FIG. 62 will be described with reference to FIG. 62A. When voltage is applied by a power supply source 410 to the electrostriction element 401, the electrostriction element 401 is elongated by $\Delta t$ toward the slider 3. The slider 3 is positioned at the central portion of the recessed portion 62 by the air under pressure (air bearing) supplied through the jetting hole 12a (the reason for this lies in that the pressure levels supplied through the jetting holes 12a and 12b are the same level, that is the strengths of the air bearings are the same). Therefore, the magnetic head 4 is moved by distance $\Delta t/2$ to the portion in which the electrostriction element 401 is not present. Since the quantity $\Delta t$ of deformation of the electrostriction element 401 can be controlled by changing the voltage to be applied, the position of the magnetic head 4 in the radial direction of the magnetic head 4 can be controlled by controlling the voltage to be applied. Therefore, the positional error (a so-called "thermal offtrack") taking place at the positioning of the magnetic head 4 due to the rise of temperature in the magnetic disc drive apparatus can be prevented. Also according to the embodiment of FIG. 62, effects similar to those obtainable according to the tenth embodiment of the present invention can be obtained. As an alternative to the electrostriction element, a shape memory alloy may be employed.

FIGS. 63 and 64 illustrate a thirty-first embodiment of the present invention in which the electrostriction element 401 is disposed on the bottom surface 62b of the recessed portion 62 in the slider supporting arm 7, the electrostriction element 401 having the jetting hole 12b formed therein. As shown in FIG. 63, the gap between the slider 3 and the magnetic disc 2 is h. When voltage is applied by the power supply source 410 to the electrostriction element 401, the electrostriction element 401 is, as shown in FIG. 64, deformed by $\Delta t'$ to close to the slider 3. Therefore, the gap between the slider 3 and the magnetic disc 2 is changed from h to h' ($<h$). Since deformation quantity $\Delta t'$ of the electrostriction element 401 can be controlled by changing the intensity of the voltage to be applied, the gap h can be controlled by controlling the power supply source 410. Therefore, according to the embodiment of FIGS. 63, 64, effects similar to those obtainable according to the tenth embodiment of the present invention can be obtained. The electrostriction element may be replaced by a shape-memory alloy.

Figure 65:
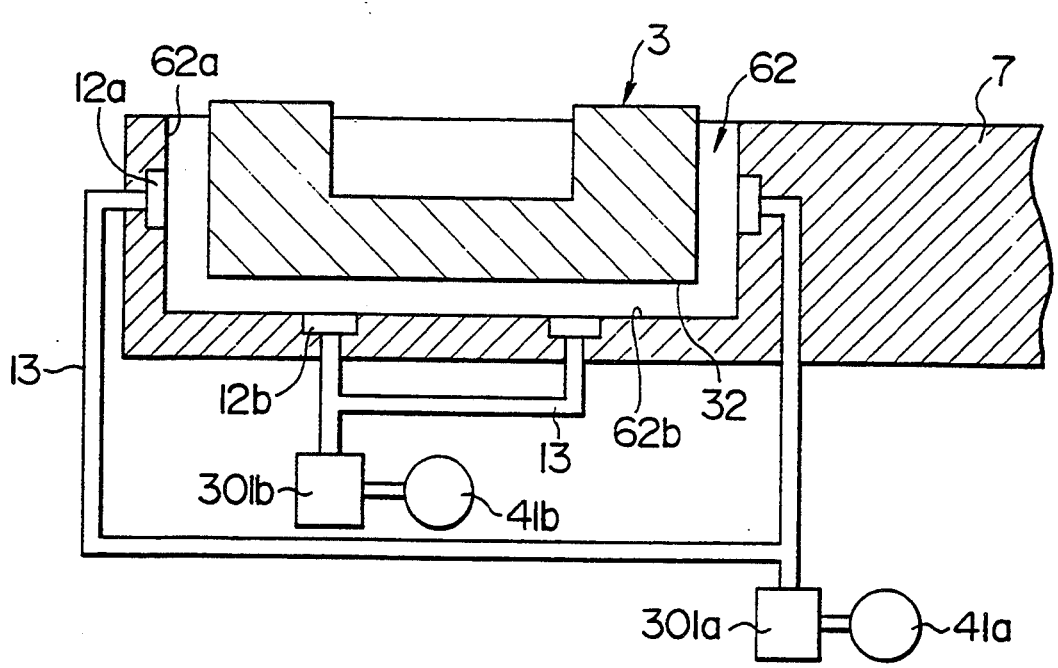
FIG. 65 is a cross sectional view which illustrates a thirty-second embodiment of the present invention.

FIG. 65 illustrates a thirty-second embodiment of the present invention in which a pump for supplying air to the jetting hole 12a formed in the side wall of the recessed portion 62 and another pump for supplying air to the jetting hole 12b formed in the bottom surface are individually provided. Specifically, air under pressure is supplied to the jetting hole 12a by a pump 41a, while that is supplied to the jetting hole 12b by a pump 41b. As a result, the intensity of the air bearing formed by the jetting hole 12a and that of the air bearing formed by the jetting hole 12b can be independently changed. Assuming that the pump 41a has higher performance and is a higher pressure type that the pump 41b, the intensity of the air bearing formed between the wall 62a of the recessed portion 62 and the side surface of the slider 3 can be made stronger than that formed between the bottom surface 62b of the recessed portion 62 and the backside 32 of the slider 3. As a result, the air bearing of the slider 3 can be increased in a direction parallel to the surface of the magnetic disc 2 without the necessity of increasing the load (acting outside the surface of the slider 3) to be applied to the slider 3. Therefore, the errors taking place when the slider 3 is positioned can be prevented. Also according to the embodiment of FIG. 65, effects similar to those obtainable according to the tenth embodiment can be obtained.

Figure 66:
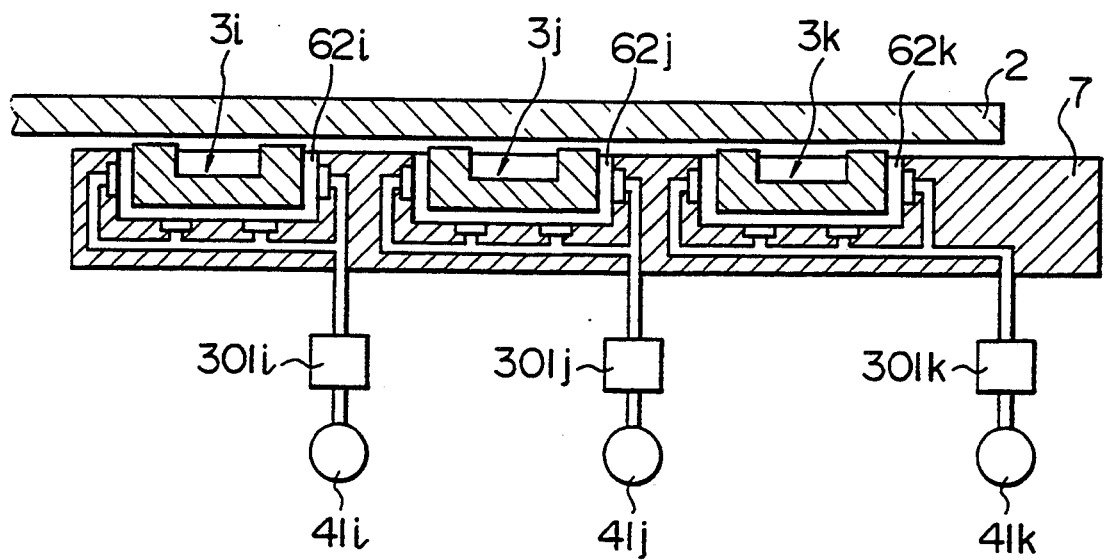
FIG. 66 is a cross sectional view which illustrates a thirty-third embodiment of the present invention.

FIG. 66 illustrates a thirty-third embodiment of the present invention in which pumps for supplying air to three recessed portion 62i, 62j and 62k for supporting three sliders 3i, 3j and 3k arranged in the radial direction of the magnetic disc 2 are independently provided. Specifically, a pump 41i is provided for the recessed portion 62i, the pump 41j is provided for the recessed portion 62j and the pump 41k is provided for the recessed portion 62k. As a result, a desired slider of a plurality of the sliders 3 provided in the slider supporting member 7 can be loaded/unloaded on the magnetic disc 2. Another structure may be employed in which a valve is provided in each of air conduits connected to the corresponding recessed portions, resulting the similar effect to be obtained. According to the above-described mechanism, the slider which has become impossible to have a predetermined gap from the magnetic disc 2 due to a disturbance or a failure can be unloaded for the purpose of protecting the magnetic disc 2 from a damage or preventing the damage of the overall body of the magnetic disc drive apparatus. Furthermore, since a desired slider 3 can be loaded on the magnetic disc 2, the necessary air pressure level (flow) to be supplied can be reduced. Therefore, the size of the pump can be reduced. In addition, effects similar to those obtainable according to the tenth embodiment can be obtained.

According to the embodiment of FIG. 66, the distances between the sliders and the magnetic disc can be equalized though the intensities of the flying force of the sliders are different from one another due to the difference in the distances from the center of the magnetic disc to the sliders by properly adjusting the pressure levels of air to be supplied to the backsides of the sliders, that is, the load to be supplied to the sliders.

What is claimed is:

1. A flying head slider supporting mechanism comprising:

a rigid body spaced from a surface of a magnetic recording medium by a predetermined distance;

an air flow passage extending through said rigid body to a surface of said rigid body opposed to said magnetic recording medium;

means for generating either an air flow passing through said air flow passage toward said surface of said magnetic recording medium or an air flow passing through said air flow passage from said surface;

a read/write head for one of reproducing data recorded on said magnetic recording medium or recording the same on said magnetic recording medium;

a head slider disposed in said air flow and carrying said read/write head;

means for movably supporting said head slider movable relative to said rigid body in a direction perpendicular to said surface of said magnetic recording medium;

means for generating a relative movement between said head slider and said magnetic recording medium;

wherein a plurality of said head sliders are provided and are spaced from each other, said head sliders being respectively disposed in said airflow and respectively supported by said means for supporting, wherein said sliders are radially disposed with respect to each other, and wherein a width of a rail for generating positive pressure of one of said sliders disposed radially outwardly is less than or equal to a width of a negative pressure generating pocket of said one of said sliders and is less than a width of a rail of another one of said sliders disposed radially inwardly from said one of said sliders.

2. A flying head slider supporting mechanism comprising:

a rigid body spaced from a surface of a magnetic recording medium by a predetermined distance;

an air flow passage extending through said rigid body to a surface of said rigid body opposed to said magnetic recording medium;

means for generating either an air flow passing through said air flow passage toward said surface of said magnetic recording medium or an air flow passing through said air flow passage from said surface;

a read/write head for one of reproducing data recorded on said magnetic recording medium or recording the same on said magnetic recording medium;

a head slider disposed in said air flow and carrying said read/write head;

means for movably supporting said head slider relative to said rigid body in a direction perpendicular to said surface of said magnetic recording medium;

means for generating a relative movement between said head slider and said magnetic recording medium;

wherein said supporting means includes a flexural member secured to said rigid body and engaging said head slider at a plurality of positions in a plane passing through a center of gravity of said head slider and extending parallel to said surface of said magnetic recording medium, and wherein said slider is divided into two sections along a plane including the center of gravity thereof, said two sections being coupled to each other so as to hold said flexural means therebetween.

* * * * *